United States Patent
Takagawa et al.

(10) Patent No.: US 7,481,946 B2
(45) Date of Patent: *Jan. 27, 2009

(54) METHOD FOR PRODUCING FERRITE MATERIAL AND FERRITE MATERIAL

(75) Inventors: Kenya Takagawa, Tokyo (JP); Eiichiro Fukuchi, Tokyo (JP); Taku Murase, Tokyo (JP)

(73) Assignee: TDK Corporation, Tokyo (JP)

( * ) Notice: Subject to any disclaimer, the term of this patent is extended or adjusted under 35 U.S.C. 154(b) by 608 days.

This patent is subject to a terminal disclaimer.

(21) Appl. No.: 10/529,333

(22) PCT Filed: Dec. 26, 2003

(86) PCT No.: PCT/JP03/16999

§ 371 (c)(1),
(2), (4) Date: Mar. 24, 2005

(87) PCT Pub. No.: WO2004/063117

PCT Pub. Date: Jul. 29, 2004

(65) Prior Publication Data

US 2006/0045839 A1    Mar. 2, 2006

(30) Foreign Application Priority Data

Jan. 10, 2003 (JP) .............................. 2003-005059
Aug. 25, 2003 (JP) .............................. 2003-299707
Aug. 28, 2003 (JP) .............................. 2003-304475

(51) Int. Cl.
C04B 35/26 (2006.01)
C04B 35/38 (2006.01)
H01F 1/34 (2006.01)

(52) U.S. Cl. ................. 252/62.62; 252/62.61; 264/611; 264/613

(58) Field of Classification Search .............. 252/62.62, 252/62.61; 264/611, 613
See application file for complete search history.

(56) References Cited

U.S. PATENT DOCUMENTS 2,924,573 A * 2/1960 Sasaki et al. .............. 252/62.62
5,698,145 A * 12/1997 Narutani et al. ............. 264/612
5,779,930 A * 7/1998 Inoue ....................... 252/62.62
5,846,448 A * 12/1998 Yasuhara et al. ......... 252/62.56
6,576,169 B2 * 6/2003 Kobayashi et al. ......... 264/37.1

(Continued)

FOREIGN PATENT DOCUMENTS

JP       05-070219       3/1993

(Continued)

OTHER PUBLICATIONS

Translation for JP 2000-159523.*

Primary Examiner—C. Melissa Koslow
(74) Attorney, Agent, or Firm—Hogan & Hartson LLP

(57) ABSTRACT

The present invention provides a production method of a ferrite material comprising as main constituents $Fe_2O_3$: 62 to 68 mol %, ZnO: 12 to 20 mol %, and MnO substantially constituting the balance, wherein the method comprises a compacting step for obtaining a compacted body by using a powder containing the main constituents, the powder having a specific surface area falling within a range between 2.5 and 5.0 m²/g and a 90% particle size of 10 µm or less, and a sintering step for sintering the compacted body obtained in the compacting step. Accordingly, the saturation magnetic flux density of the Mn—Zn based ferrite can be improved.

19 Claims, 16 Drawing Sheets

U.S. PATENT DOCUMENTS 6,752,932 B2 * 6/2004 Ishida et al. ............ 252/62.62

FOREIGN PATENT DOCUMENTS

| JP | 06-120022 | | 4/1994 |
| --- | --- | --- | --- |
| JP | 07-315919 | | 12/1995 |
| JP | 08-169756 | | 7/1996 |
| JP | 10-074612 | | 3/1998 |
| JP | 10-203864 | * | 8/1998 |
| JP | 2000-159523 | | 6/2000 |
| JP | 2002-25559 | | 9/2002 |

* cited by examiner

FIG. 3

| PO$_2$ at 1350°C (%) | ρ (Ω·m) | Pcv (kW/m³) | Pev (kW/m³) | Change rate of Pcv (%) | δ Value |
|---|---|---|---|---|---|
| 1 | 0.798 | 948 | 297 | 21.0 | 0.0052 |
| 0.2 | 0.339 | 1073 | 472 | 15.2 | 0.0034 |
| 0.05 | 0.078 | 2493 | 2079 | 5.0 | 0.0030 |
| 0.02 | 0.039 | 3765 | 3347 | 2.3 | 0.0022 |
| 0.005 | 0.034 | 7799 | 4947 | −0.9 | 0.0020 |
| 0.002 | 0.039 | 5131 | 4222 | 1.3 | 0.0029 |

FIG. 5

| $PO_2$ at 1350°C | Temperature in slow cooling range | $\rho$ ($\Omega \cdot m$) | Pcv ($kW/m^3$) | Pev ($kW/m^3$) |
|---|---|---|---|---|
| 0.02 | No slow cooling | 0.039 | 3765 | 3347 |
| 0.02 | 1100~1000 | 0.052 | 2789 | 2259 |
| 0.02 | 1000~900 | 0.103 | 1752 | 1040 |
| 0.02 | 900~800 | 0.064 | 2587 | 2093 |
| 0.02 | 800~700 | 0.056 | 3194 | 2503 |
| 0.02 | 700~600 | 0.043 | 3055 | 2307 |

FIG. 6

| No | Fe$_2$O$_3$ (mol%) | MnO (mol%) | ZnO (mol%) | NiO (mol%) | LiO$_{0.5}$ (mol%) | Bs (mT) | Pcv (kW/m$^3$) | ρ (Ω·m) | Change rate of Pcv |
|---|---|---|---|---|---|---|---|---|---|
| 1 | 60.0 | 21.0 | 15.0 | 4.0 | — | 468 | 1530 | 1.307 | 0.7 |
| 2 | 63.0 | 17.0 | 18.0 | 2.0 | — | 500 | 892 | 0.821 | -0.3 |
| 3 | 65.0 | 17.0 | 16.0 | 2.0 | — | 507 | 1186 | 0.753 | 2.7 |
| 4 | 67.0 | 18.5 | 14.0 | 0.5 | — | 502 | 1303 | 0.679 | 4.8 |
| 5 | 70.0 | 14.5 | 15.0 | 0.5 | — | 474 | 2830 | 0.275 | 7.2 |
| 6 | 67.0 | 21.0 | 10.0 | 2.0 | — | 469 | 2072 | 0.196 | 6.9 |
| 7 | 65.0 | 19.0 | 14.0 | 2.0 | — | 510 | 1249 | 0.493 | 3.4 |
| 8 | 64.0 | 16.5 | 18.0 | 1.5 | — | 500 | 1103 | 0.789 | 2.0 |
| 9 | 65.0 | 13.5 | 21.0 | 0.5 | — | 479 | 1900 | 0.624 | 1.8 |
| 10 | 67.0 | 18.5 | 14.0 | 0.5 | — | 499 | 1035 | 0.251 | 7.8 |
| 11 | 64.0 | 18.0 | 16.0 | 2.0 | — | 502 | 968 | 0.666 | 4.3 |
| 12 | 64.0 | 18.0 | 14.0 | 4.0 | — | 506 | 1148 | 0.419 | 2.9 |
| 13 | 64.0 | 16.0 | 14.0 | 6.0 | — | 509 | 1632 | 0.380 | 3.1 |
| 14 | 63.0 | 18.0 | 19.0 | — | — | 466 | 723 | 1.179 | 1.3 |
| 15 | 64.0 | 19.0 | 16.0 | — | 1.0 | 501 | 917 | 0.728 | 3.8 |
| 16 | 64.0 | 18.0 | 16.0 | — | 2.0 | 504 | 1032 | 0.661 | 2.9 |
| 17 | 64.0 | 16.0 | 16.0 | — | 4.0 | 491 | 1720 | — | — |

⟨Remarks⟩
Additives: SiO$_2$:200ppm
CaCO$_3$:1500ppm
Nb$_2$O$_5$:200ppm

FIG. 7

| No. | SSA (m²/g) | 10%Ps (μm) | 50%Ps (μm) | 90%Ps (μm) | Bs (mT) | Density (g/cm³) | Pcv (kW/m³) | $\mu i$ |
|---|---|---|---|---|---|---|---|---|
| 18 | 2.44 | 0.73 | 1.82 | 23.62 | 498 | 4.92 | 1020 | 826 |
| 19 | 2.53 | 0.73 | 1.72 | 10.80 | 503 | 4.93 | 1077 | 833 |
| 20 | 2.66 | 0.72 | 1.52 | 6.02 | 509 | 4.95 | 1078 | 838 |
| 21 | 2.75 | 0.72 | 1.23 | 3.41 | 518 | 4.99 | 1008 | 848 |
| 22 | 3.01 | 0.64 | 1.04 | 2.04 | 523 | 5.02 | 1054 | 738 |
| 23 | 3.55 | 0.59 | 0.91 | 1.38 | 522 | 5.02 | 1054 | 725 |
| 24 | 4.15 | 0.59 | 0.85 | 1.19 | 522 | 5.01 | 990 | 799 |
| 25 | 5.27 | 0.52 | 0.72 | 0.95 | 520 | 5.01 | 1484 | 676 |

FIG. 8

| No. | Main constituents | | | | | Additives | SSA (m²/g) | 90%Ps (μm) | Bs (mT) | Density (g/cm³) | Pcv (kW/m³) | μi |
|---|---|---|---|---|---|---|---|---|---|---|---|---|
| | Fe₂O₃ (mol%) | MnO (mol%) | ZnO (mol%) | NiO (mol%) | LiO₀.₅ (mol%) | | | | | | | |
| 26 | 63 | 17 | 18 | 2 | – | SiO₂:100ppm<br>CaCO₃:1500ppm<br>Nb₂O₅:200ppm<br>* SiO₂/CaCO₃=0.07 | 3.19 | 1.35 | 494 | 5.05 | 661 | 1059 |
| 27 | 67 | 18.5 | 14 | 0.5 | – | | 3.34 | 1.27 | 505 | 4.88 | 988 | 702 |
| 28 | 64 | 19 | 16 | – | 1 | | 3.11 | 1.39 | 510 | 5.04 | 951 | 890 |
| 29 | 64 | 18 | 16 | 1 | 2 | | 3.27 | 1.29 | 504 | 5.04 | 901 | 732 |
| 30 | 63 | 17.5 | 18 | 0.5 | 0.5 | | 3.24 | 1.25 | 507 | 5.06 | 1167 | 803 |
| 31 | 64 | 16.5 | 18 | 0.5 | 2 | | 3.41 | 1.26 | 504 | 5.04 | 1026 | 799 |
| 32 | 67 | 18 | 15 | – | – | | 3.31 | 1.27 | 483 | 4.80 | 1013 | 658 |

FIG. 9

| No. | Partial pressure of oxygen (%) <at 900~1350°C> | Bs (mT) | Density (g/cm³) | Pcv (kW/m³) | B.Temp. (°C) | μi |
|---|---|---|---|---|---|---|
| 33 | 0.0 | 517 | 4.96 | 1030 | 90 | 740 |
| 34 | 1.0 | 502 | 4.89 | 1021 | 90 | 807 |
| 35 | 3.0 | 494 | 4.88 | 1009 | 90 | 837 |
| 36 | 5.0 | 477 | 4.83 | 1012 | 90 | 840 |

FIG. 10

| No. | Sintering conditions | | | | Bs (mT) | Density (g/cm³) | Change rate of μi (%) | | Change rate of Pcv (%) | |
|---|---|---|---|---|---|---|---|---|---|---|
| | Temperature increasing rate (°C/hr) ⟨at 900 to 1350°C⟩ | Constant temperature ranges | | Retention temperature–retention time ⟨°C–hr⟩ | | | Without surround | With surround | Without surround | With surround |
| | | I | II | | | | | | | |
| 37 | 300 | — | — | 1350°C–5hr | 480 | 4.81 | −14.2 | −5.1 | 17.9 | 8.3 |
| 38 | 150 | — | — | | 489 | 4.82 | — | — | — | — |
| 39 | 75 | — | — | | 495 | 4.86 | −17.5 | −7 | 21 | 6 |
| 40 | 75 | 950°C : 1hr | — | | 506 | 4.92 | — | — | — | — |
| 41 | 75 | 1200°C : 0.5hr | — | | 506 | 4.95 | −14.4 | −4 | 19 | 7.3 |
| 42 | 75 | 1200°C : 1hr | — | | 510 | 4.97 | — | — | — | — |
| 43 | 50 | 950°C : 1hr | 1200°C : 1hr | | 516 | 4.96 | −16.2 | −4.9 | 17 | 5.8 |

FIG. 12

| No. | $Fe_2O_3$ (mol%) | MnO (mol%) | ZnO (mol%) | NiO (mol%) | $LiO_{0.5}$ (mol%) | Bs (mT) | Pcv (kW/m³) | B.Temp. (°C) | $\mu i$ | Additives |
|---|---|---|---|---|---|---|---|---|---|---|
| 45 | 63.0 | 17.0 | 18.0 | 2.0 | — | 494 | 661 | 100 | 1059 | |
| 46 | 67.0 | 18.5 | 14.0 | 0.5 | — | 505 | 988 | 100 | 702 | $SiO_2$:100ppm |
| 47 | 64.0 | 19.0 | 16.0 | — | 1.0 | 510 | 951 | 100 | 890 | $CaCO_3$:1500ppm |
| 48 | 64.0 | 18.0 | 16.0 | — | 2.0 | 504 | 901 | 120 | 732 | $Nb_2O_5$:200ppm |
| 49 | 63.0 | 17.5 | 18.0 | 1.0 | 0.5 | 507 | 1167 | 80 | 803 | Weight ratio of $SiO_2$ content to $CaCO_3$ content = 0.07 |
| 50 | 64.0 | 16.5 | 18.0 | 0.5 | 2.0 | 504 | 1026 | 100 | 799 | |
| 51 | 67.0 | 18.0 | 15.0 | — | — | 483 | 1013 | 100 | 658 | |

FIG. 13

| No. | Atmosphere for temperature increasing process | | Bs (mT) | Density (g/cm³) | Pc (kW/m³) | B.Temp. (°C) | μi |
|---|---|---|---|---|---|---|---|
| | Atmospheric air | Partial pressure of oxygen: 0% | | | | | |
| 52 | ~600°C | 600°C~ | 518 | 4.97 | 1058 | 90 | 770 |
| 53 | ~900°C | 900°C~ | 515 | 4.96 | 1027 | 90 | 796 |
| 54 | ~1100°C | 1100°C~ | 498 | 4.87 | 1044 | 90 | 802 |

FIG. 14

| No. | Additives (ppm) SiO₂ | Additives (ppm) CaCO₃ | Additives (ppm) Total amount | Si/Ca | PO₂ (%) | Bs (mT) | Pcv (kW/m³) | ρ (Ω·m) | Change rate of Pcv | Other constituents |
|---|---|---|---|---|---|---|---|---|---|---|
| 55-1 | 100 | 2000 | 2100 | 0.050 | 0.02 | 502 | 3545 | 0.052 | 2.7 | |
| 55-2 | | | | | 1.0 | 493 | 1400 | 0.138 | 15.4 | |
| 56-1 | 100 | 2500 | 2600 | 0.040 | 0.02 | 503 | 2182 | 0.068 | 5.2 | |
| 56-2 | | | | | 1.0 | 499 | 1407 | 0.099 | 12.3 | |
| 57-1 | 150 | 1500 | 1650 | 0.100 | 0.02 | 504 | 2025 | 0.073 | −0.8 | Fe₂O₃: 64.0mol% |
| 57-2 | | | | | 1.0 | 500 | 884 | 1.186 | 16.3 | MnO: 17.5mol% |
| 58-1 | 150 | 2500 | 2650 | 0.060 | 0.02 | 505 | 1220 | 0.219 | 3.7 | ZnO: 16.5mol% |
| 58-2 | | | | | 1.0 | 494 | 870 | 0.879 | 14.2 | NiO: 2.0mol% |
| 59 | 200 | 500 | 700 | 0.400 | 0.02 | 458 | 10389 | 0.063 | 2.3 | Nb₂O₅: 200ppm |
| 60 | 200 | 1000 | 1200 | 0.200 | 0.02 | 492 | 2132 | 0.078 | 4.7 | |
| 61 | 200 | 1500 | 1700 | 0.133 | 0.02 | 501 | 1250 | 0.200 | 5.4 | |
| 62 | 200 | 2000 | 2200 | 0.100 | 0.02 | 500 | 1180 | 0.334 | 3.9 | |
| 63 | 200 | 2500 | 2700 | 0.080 | 0.02 | 499 | 1163 | 0.422 | 3.4 | |
| 64 | 250 | 500 | 750 | 0.500 | 0.02 | 461 | 4251 | 0.048 | 3.8 | |
| 65 | 250 | 1500 | 1750 | 0.167 | 0.02 | 494 | 1234 | 0.360 | 6.7 | |

FIG. 15

| No. | Additives (ppm) | | | Bs (mT) | Pcv (kW/m³) | ρ (Ω·m) | Change rate of Pcv | Correspondence | Other constituents |
|---|---|---|---|---|---|---|---|---|---|
| | SiO₂ | CaCO₃ | Total amount | Si/Ca | | | | | |
| 66 | 100 | 2500 | 2600 | 0.040 | 497 | 1502 | 0.125 | 5.2 | 56-1 | Fe$_2$O$_3$: 64.0mol%<br>MnO: 17.5mol%<br>ZnO: 16.5mol%<br>NiO: 2.0mol%<br>Nb$_2$O$_5$: 200ppm |
| 67 | 150 | 1500 | 1650 | 0.100 | 499 | 1345 | 0.214 | 5.9 | 57-1 | |
| 68 | 150 | 2500 | 2650 | 0.060 | 503 | 1234 | 0.139 | 3.1 | 58-1 | |
| 69 | 200 | 500 | 700 | 0.400 | 459 | 2856 | 0.072 | 4.1 | 59 | |
| 70 | 200 | 1000 | 1200 | 0.200 | 496 | 1281 | 0.299 | 3.3 | 60 | |
| 71 | 200 | 1500 | 1700 | 0.133 | 497 | 1124 | 0.766 | 4.6 | 61 | |
| 72 | 200 | 2000 | 2200 | 0.100 | 497 | 1112 | 1.090 | 4.8 | 62 | |
| 73 | 200 | 2500 | 2700 | 0.080 | 494 | 1251 | 0.163 | 4.8 | 63 | |
| 74 | 250 | 500 | 750 | 0.500 | 463 | 1847 | 0.123 | 2.5 | 64 | |
| 75 | 250 | 1500 | 1750 | 0.167 | 502 | 1052 | 1.246 | 2.2 | 65 | |
| 76 | 150 | 2000 | 2150 | 0.075 | 482 | 1148 | 0.611 | 0.8 | — | Fe$_2$O$_3$: 64.0mol%<br>MnO: 16.0mol%<br>ZnO: 20.0mol%<br>Nb$_2$O$_5$: 200ppm |
| 77 | 150 | 2500 | 2650 | 0.060 | 487 | 1127 | 0.433 | 1.2 | — | |
| 78 | 200 | 2000 | 2200 | 0.100 | 486 | 998 | 1.326 | 4.5 | — | |
| 79 | 200 | 2500 | 2700 | 0.080 | 486 | 1035 | 0.314 | 3.6 | — | |

FIG. 16

| No. | Additive | | Additive amount (ppm) | Bs (mT) | Pcv (kW/m³) | ρ (Ω·m) | Change rate of Pcv | Other constituents |
|---|---|---|---|---|---|---|---|---|
| 80 | Second additive | ZrO₂ | 100 | 500 | 1052 | 0.981 | 3.0 | Fe₂O₃: 66.0mol% |
| 81 | Fourth additive | In terms of P (Ca₃(PO₄)₂) | 20 | 511 | 1324 | 0.633 | 6.2 | MnO: 18.5mol% |
| 82 | | MoO₃ | 100 | 518 | 1293 | 0.753 | 5.7 | ZnO: 14.0mol% |
| 83 | | MoO₃ | 200 | 509 | 1221 | 0.679 | 4.4 | NiO: 1.5mol% |
| 84 | | V₂O₅ | 200 | 509 | 1221 | 0.679 | 4.1 | SiO₂: 200ppm |
| 85 | | GeO₂ | 100 | 507 | 1169 | 0.275 | 7.0 | CaCO₃: 1500ppm |
| 86 | | Sb₂O₃ | 1000 | 512 | 1078 | 0.761 | 2.4 | Nb₂O₅: 200ppm |

METHOD FOR PRODUCING FERRITE MATERIAL AND FERRITE MATERIAL

TECHNICAL FIELD

The present invention relates to a Mn—Zn based ferrite and a production method thereof. In particular, the present invention relates to a technique for improving the saturation magnetic flux density of the Mn—Zn based ferrite in the temperature region in the vicinity of 100° C. while attempting to achieve lowering of loss in the Mn—Zn based ferrite.

BACKGROUND ART

In these years, downsizing and high powering of electronic devices have been promoted. Accordingly, high density integration and high speed processing of various components have progressed, and thus power supply lines are demanded to supply large electric current.

Additionally, even under high temperatures, demanded are power supply lines which can maintain the predetermined performances. This is because power supply lines are exposed to heat emitted by components (for example, CPU) as the case may be. Additionally, power supply lines are required to maintain predetermined performances under such conditions that the environmental temperature is high as in automobile electronic circuits.

Accordingly, transformers and reactors to be used in power supply lines are also required to be capable of being used with large current even under high temperatures.

As the materials to be used for these transformers and reactors, soft magnetic metal materials and ferrite materials can be cited. Additionally, ferrite materials are classified into Mn—Zn based ferrites and Ni based ferries.

Soft magnetic metal materials are higher in saturation magnetic flux density than ferrites, and hence cause no magnetic saturation even for large currents flowing therethrough. However, there are problems in that soft magnetic metal materials are generally high in loss, high in price, high in specific gravity, and poor in rustproof property.

On the other hand, ferrites are excellent in cost performance, and have advantage such that loss is low in a frequency range between a few 10 kHz and a few 100 kHz. Additionally, Mn—Zn based ferrites are higher in saturation magnetic flux density than Ni based ferrites. Therefore, for transformers and choke coils (hereinafter, both components are referred to as "transformers and the like," as the case may be) for large in current, Mn—Zn based ferrites are generally used.

However, in these years, ferrite materials have been demanded which exhibit high saturation magnetic flux density even when used in a high temperature region, specifically, in the vicinity of 100° C. Although as described above, Mn—Zn based ferrites exhibit higher saturation magnetic flux densities than Ni based ferrites, the saturation magnetic flux densities of the Mn—Zn based ferrites are insufficient in the high temperature region in the vicinity of 100° C. (hereinafter simply referred to as "the high temperature region").

Thus, for the purpose of improving the saturation magnetic flux densities of the ferrite materials in the high temperature region, various investigations have been carried out. Among these, for example, Patent Document 1 (Japanese Patent Laid-Open No. 2000-159523) discloses that a saturation magnetic flux density of 450 mT or more (measurement magnetic field: 1000 A/m) can be obtained at 100° C. by adopting a composition in which the content of iron oxide is such large as 60 to 75 mol %, the content of zinc oxide is 0 to 20 mol % (not inclusive of 0) and the balance is composed of manganese oxide. Patent Document 1 states that for the purpose of obtaining a saturation magnetic flux density of 450 mT or more (measurement magnetic field: 1000 A/m) at 100° C., calcining and sintering conditions are needed to be specified in addition to the composition.

Although the technique disclosed in Patent Document 1 is effective for such a technical problem as improvement of the saturation magnetic flux density demanded for Mn—Zn based ferrites, further improvement of the saturation magnetic flux density is demanded. Needless to say, it is preferable that the saturation magnetic flux density can be improved by a technique which can maintain the feature of ferrite that ferrite is excellent in cost performance.

For ferrite materials, in addition to high saturation magnetic flux density, a property of being low in loss is also demanded. Thus, various proposals have been made also for the purpose of lowering of the loss of Mn—Zn based ferrites. For example, in Patent Document 2 (Japanese Patent Publication No. 63-59241), an attempt has been made for lowering of loss at 150° C. or higher by adding at least one selected from NiO, $Li_2O$ and MgO to MnO and ZnO.

Although for a ferrite core disclosed in Patent Document 2, an attempt has been made to lower the loss in a temperature region of 150° C. or higher, no consideration has been made for the saturation magnetic flux density. Additionally, because the bottom temperature is 150° C. or higher, in the temperature range (60 to 130° C.) in which common transformers and the like are used, the loss and the initial permeability are caused to be degraded.

The present invention has been achieved in view of these technical problems, and takes as its object to provide a production method of a ferrite material which can improve the saturation magnetic flux density of a Mn—Zn based ferrite by means of a simple technique. Moreover, the present invention takes as its object to provide a ferrite material having a high saturation magnetic flux density and a low loss in the temperature range in which common transformers and the like are used.

DISCLOSURE OF THE INVENTION

The present inventors have made investigation for the purpose of solving the above described problems, and consequently have found that the saturation magnetic flux density of a ferrite material is improved which is obtained by compacting and sintering a powder having a specific surface area and also a 90% particle size falling within particular ranges, respectively. More specifically, the present invention is a production method of a ferrite material comprising, as main constituents, $Fe_2O_3$: 62 to 68 mol %, ZnO: 12 to 20 mol %, and the balance substantially being MnO, the method being characterized by comprising a compacting step for obtaining a compacted body by using a powder comprising the main constituents which has a specific surface area falling within a range between 2.5 and 5.0 $m^2/g$ and a 90% particle size of 10 μm or less, and a sintering step for sintering the compacted body obtained in the compacting step.

In the production method of a ferrite material in the present invention, it is preferable that the 50% particle size falls within a range between 0.8 and 1.8 μm and the 10% particle size falls within a range between 0.55 and 0.73 μm.

Moreover, in the production method of a ferrite material in the present invention, it is preferable that the specific surface area is set in a range between 2.7 and 5.0 $m^2/g$ and the 90% particle size is set at 5 μm or less.

In the above described approach, the electromagnetic properties of a Mn—Zn based ferrite is improved by controlling the powder properties. In the present invention, another approach is also proposed in which the electromagnetic properties of a Mn—Zn based ferrite is improved by controlling the temperature increasing conditions and/or the temperature decreasing conditions in the sintering step.

In other words, as an approach in which the temperature increasing conditions are controlled in the sintering step, the present invention provides a production method of a ferrite material comprising, as main constituents, $Fe_2O_3$: 62 to 68 mol %, ZnO: 12 to 20 mol %, and the balance substantially being MnO, the method comprising a compacting step for obtaining a compacted body by using a powder comprising the main constituents, and a sintering step for sintering the compacted body obtained in the compacting step; and the sintering step comprising a temperature increasing process having a range in which a partial pressure of oxygen of 4.0% or less is maintained and temperature is increased up to a predetermined temperature, a temperature retention process for retaining the sintering atmosphere at a predetermined temperature, and a temperature decreasing process subsequent to the temperature retention process.

In the present invention, it is preferable that the average temperature increasing rate in a temperature range of 900° C. or higher in the temperature increasing process is set at 200° C./hr or less.

Additionally, in the present invention, it is preferable that a constant temperature range to maintain the predetermined temperature is set in the temperature range of 900° C. or higher in the temperature increasing process.

Moreover, as an approach to control the temperature decreasing conditions in the sintering step, the present invention provides a production method of a ferrite material comprising, as main constituents, $Fe_2O_3$: 62 to 68 mol %, ZnO: 12 to 20 mol %, and the balance substantially being MnO, the method is characterized in that the method comprises a compacting step for obtaining a compacted body by using a powder comprising the main constituents, and a sintering step for sintering the compacted body obtained in the compacting step; the sintering step comprises a temperature retention process for retaining the sintering atmosphere within a predetermined temperature range, and a temperature decreasing process carried out after the temperature retention process in an atmosphere of nitrogen; and a slow cooling range having a cooling rate of 100° C./hr or less is set in the temperature decreasing process.

In the present invention, it is preferable that the slow cooling range includes a range between 1000 and 900° C.

The production method of a ferrite material of the present invention can comprise NiO: 5 mol % or less (not inclusive of 0) and/or $LiO_{0.5}$: less than 4 mol % (not inclusive of 0) in addition to the above described main constituents.

According to the production method of a ferrite material of the present invention described above in detail, there can be obtained a ferrite material which has a saturation magnetic flux density at 100° C. of 470 mT or more (measurement magnetic field: 1194 A/m) and a core loss of 1400 kW/m³ or less (measurement conditions: 100 kHz, 200 mT). In the present invention, when simply referred to as a "core loss," what is meant is the minimum core loss value.

According to the production method of a ferrite material of the present invention, there can be obtained a ferrite material having a volume resistivity at room temperature of 0.13 Ω·m or more.

Moreover, in the present invention, it is preferable that a screen substance is arranged to block the direct collision of the gas flow, generated in the sintering atmosphere in the sintering step, to the compacted bodies.

More specifically, when two or more compacted bodies are sintered in a laminated condition, it is preferable to arrange the screen substance so as to surround the circumferences of the compacted bodies.

The screen substance can be constituted of a sintered body having substantially the same composition as that of the desired ferrite material. It is to be noted that the sintering step with a screen substance arranged can also be applied to ferrite materials having compositions other than the composition specified in the present invention.

In these years, in addition to making Mn—Zn based ferrites have a high saturation magnetic flux density and a low loss, it is demanded that the degradation of the core loss when used in the above described high temperature region is small, that is, reliability is demanded. A technique for ensuring the reliability for the core loss is disclosed in Patent Document 3 (Japanese Patent Laid-Open No. 2002-255559). In Patent Document 3, in a Mn—Ni—Zn based ferrite comprising, as main constituents, $Fe_2O_3$: 55.0 to 59.0 mol %, ZnO: 0 to 15.0 mol %, NiO: 2.0 to 10.0 mol %, and the balance substantially being MnO, the sintering atmosphere is made to have a low partial pressure of oxygen. Moreover, it is proposed that in the temperature decreasing process subsequent to the retention at a predetermined temperature, the sintering atmosphere is converted to an atmosphere of nitrogen for the temperatures equal to or lower than a predetermined temperature, and the cooling rate is also made larger than that before the predetermined temperature.

Although the proposal of Patent Document 3 is effective in ensuring the reliability for the core loss, the saturation magnetic flux density in the high temperature region is insufficient because the content of iron oxide in the target material is such low as 55.0 to 59.0 mol %.

For the purpose of solving the above described problems, with the above described objects, the present inventors have made an investigation on a Fe-rich Mn—Zn based ferrite having an iron oxide content more than 60 mol %, and have obtained the following findings.

(i) A Fe-rich Mn—Zn based ferrite is advantageous for obtaining a high saturation magnetic flux density, but cation vacancies tend to be easily generated which causes the degradation of the reliability for the core loss in a non-negligible manner.

(ii) In order to suppress the generation of cation vacancies, the atmosphere in sintering may be controlled to have a low partial pressure of oxygen (for example, a partial pressure of oxygen less than 1%). Sintering under a low partial pressure of oxygen is effective for suppressing the generation of cation vacancies, namely, for ensuring the reliability for the core loss, but degrades the core loss itself.

With the above described background, the present inventors have investigated the relation of the core loss and eddy current loss to the volume resistivity on the Fe-rich Mn—Zn based ferrite sintered in the low partial pressure of oxygen. Consequently, it has been verified that the Fe-rich Mn—Zn based ferrite which exhibits a high core loss and a high eddy current loss exhibits a low volume resistivity. The volume resistivity is understood to be dependent on the state of presence of CaO and the like contained in the Mn—Zn based ferrite as additives. In other words, when appropriate amounts of the additives such as CaO are segregated in the grain boundaries of the Mn—Zn based ferrite, a predetermined volume resistivity can be obtained.

The present inventors inferred that the Fe-rich Mn—Zn based ferrite sintered in a low partial pressure of oxygen had the additives such as CaO present inside the grains with a large content and hence the volume resistivity of the ferrite was low. Thus, the present inventors attempted to achieve a technique for making the additives such as CaO residing inside the grains segregate into the grain boundaries in appropriate amounts.

The additives such as CaO are present inside the grains in the high temperature region in the sintering step, but the state of presence of the additives inside the grains are unstable, so that the additives segregate in the grain boundaries in the temperature decreasing process subsequent to the retention at the predetermined temperature. However, it is understood that in the atmosphere of the low partial pressure of oxygen, the additives such as CaO tend to remain inside the grains, and hence the segregation into the grain boundaries is suppressed to decrease the volume resistivity. Thus, for the purpose of making the additives such as CaO segregate into the grain boundaries in appropriate amounts, the additives such as CaO were made to be contained in larger amounts than conventionally contained, or the cooling rate was made slower in the temperature decreasing process in the sintering step. It was verified that the volume resistivity was improved in the Fe-rich Mn—Zn based ferrite thus obtained.

In other words, the present invention provides a novel ferrite material which has a high saturation magnetic flux density and has a high volume resistivity to serve as an indicator for the core loss. The ferrite material is formed of a sintered body comprising as main constituents $Fe_2O_3$: 62 to 68 mol %, ZnO: 12 to 20 mol %, and the balance substantially being MnO; and the ferrite material has a saturation magnetic flux density at 100° C. of 470 mT or more (measurement magnetic field: 1194 A/m), and a volume resistivity of 0.13 Ω·m or more at room temperature.

It is effective that the ferrite material of the present invention comprises, as first additives, 900 to 3000 ppm of Si and Ca together, when their levels are determined in terms of $SiO_2$ and $CaCO_3$, respectively, under the condition that $SiO_2/CaCO_3$=0.055 to 0.30.

Additionally, it is effective that the ferrite material of the present invention comprises, as first additives, 1700 to 3000 ppm of Si and Ca together, when their levels are determined in terms of $SiO_2$ and $CaCO_3$, respectively, under the condition that $SiO_2/CaCO_3$=0.055 to 0.19.

The addition of the first additives is based on the findings of the present inventors that when predetermined amounts of the first additives are comprised, there can be obtained a ferrite material in which the saturation magnetic flux density in the high temperature region is high, the core loss is low and the reliability for the core loss is high. Inclusion of $SiO_2$ and $CaCO_3$ respectively within the ranges recommended by the present invention generates segregation of $SiO_2$ and $CaCO_3$ into the grain boundaries in appropriate amounts. Alternatively, setting of a slow cooling range in the above described temperature decreasing process in sintering can generate segregation of $SiO_2$ and $CaCO_3$ as first additives into the grain boundaries in appropriate amounts.

The ferrite material of the present invention can comprise NiO: 5 mol % or less (not inclusive of 0%) and/or $LiO_{0.5}$: less than 4 mol % (not inclusive of 0) in addition to the above described main constituents ($Fe_2O_3$, ZnO, MnO).

The ferrite material of the present invention can attain such properties that the core loss is 1400 kW/m³ or less (measurement conditions: 100 kHz, 200 mT) and the core loss change rate is 10% or less (core loss change rate=(Pcv1−Pcv2)/Pcv1×100, Pcv1: the core loss before high temperature storage, Pcv2: the core loss after high temperature storage, high temperature storage: 150° C.×2000 hour).

It is preferable that in the ferrite material of the present invention, the .delta. value (the cation vacancy amount) in the following ferrite composition formula (1) is 0.0033 or less:

$$(Zn_a^{2+}, Ni_b^{2+}, Mn_c^{2+}, Mn_d^{3+}, Fe_e^{2+}, Fe_f^{3+})O_{4+\delta} \quad (1)$$

where a+b+c+d+e+f=3, and δ=a =b +c +(3/2)d +e +(3/2)f−4.

Moreover, the present invention provides a ferrite material which comprises $LiO_{0.5}$: less than 4 mol % (not inclusive of 0) and has a saturation magnetic flux density at 100° C. of 490 mT or more (measurement magnetic field: 1194 A/m) and a core loss of 1300 kW/m³ or less (measurement conditions: 100 kHz, 200 mT).

The above-mentioned ferrite material of the present invention preferably comprises, as second additives, at least one selected from $Nb_2O_5$: 400 ppm or less (not inclusive of 0), $ZrO_2$: 1000 ppm or less (not inclusive of 0), $Ta_2O_5$: 1000 ppm or less (not inclusive of 0), $In_2O_3$: 1000 ppm or less (not inclusive of 0), and $Ga_2O_3$: 1000 ppm or less (not inclusive of 0).

Yet additionally, the ferrite material of the present invention preferably comprises, as third additives, at least one selected from $SnO_2$: 10000 ppm or less (not inclusive of 0) and $TiO_2$: 10000 ppm or less (not inclusive of 0).

In addition, the ferrite material of the present invention preferably comprises, as fourth additives, at least one selected from a P compound: 35 ppm or less (not inclusive of 0) in terms of P, $MoO_3$: 1000 ppm or less (not inclusive of 0), $V_2O_5$: 1000 ppm or less (not inclusive of 0), $GeO_2$: 1000 ppm or less (not inclusive of 0), $Bi_2O_3$: 1000 ppm or less (not inclusive of 0), and $Sb_2O_3$: 3000 ppm or less (not inclusive of 0). For the purpose of achieving high saturation magnetic flux density in ferrite materials, it is effective to increase the content of Fe in the main composition. However, as the content of Fe increases, sintering hardly comes to proceed. Therefore, when an Fe-rich composition is selected, it is necessary to elevate the sintering temperature. However, if the sintering temperature is elevated, the Zn component is evaporated and the core loss is thereby increased. Moreover, the elevation of the sintering temperature leads to the increase of the energy consumption, the cost rise for the furnace material and the like, which may probably make industrial demerit. For the purpose of obtaining a ferrite material having a high saturation magnetic flux density in the high temperature region and a low loss while eliminating such demerit, it is effective to contain the fourth additives.

BRIEF DESCRIPTION OF THE DRAWINGS

FIG. 3 is a table showing the measured results of the variations of the volume resistivity at room temperature, minimum core loss value, minimum eddy current loss value, core loss change rate and δ value (cation vacancy amount) when the partial pressure of oxygen ($PO_2$) in the sintering atmosphere was varied;

FIG. 5 is a table showing that it is preferable that the slow cooling range (IIIb) is set in a temperature range from 1000 to 900° C. in the temperature decreasing process (III);

FIG. 6 is a table showing the compositions and the like of samples Nos. 1 to 17 obtained in Example 1;

FIG. 7 is a table showing the specific surface areas and the like of samples Nos. 18 to 25 obtained in Example 2;

FIG. 8 is a table showing the compositions and the like of samples Nos. 26 to 32 obtained in Example 3;

FIG. 9 is a table showing the relation between the partial pressure of oxygen in the temperature increasing process and the saturation magnetic flux density;

FIG. 10 is a table showing the sintering conditions and the like of samples Nos. 37 to 43 obtained in Example 5;

FIG. 12 is a table showing the compositions and the like of samples Nos. 45 to 51 obtained in Example 6;

FIG. 13 is a table showing the atmospheres and the like in the temperature increasing process for samples Nos. 52 to 54 obtained in Example 7;

FIG. 14 is a table showing the additives and the like of samples Nos. 55-1 to 65 obtained in Example 8;

FIG. 15 is a table showing the saturation magnetic flux densities and the like of samples Nos. 66 to 79 prepared by setting a slow cooling range; and FIG. 16 is a table showing the saturation magnetic flux densities and the like for the cases in which second additives and fourth additives are contained.

BEST MODE FOR CARRYING OUT THE INVENTION

Figure 1A:
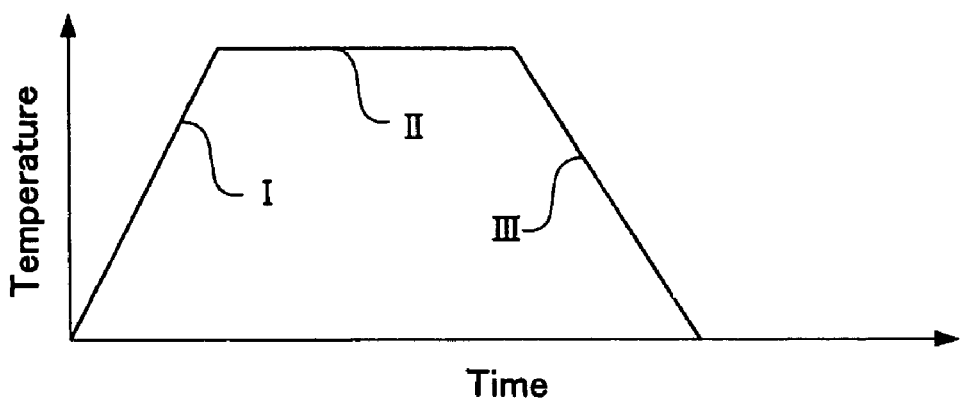
FIG. 1A is a graph showing a sintering pattern in which the temperature is increased continuously at a constant temperature-increasing rate.

The embodiments of the present invention will be described below.

At the beginning, the composition of a Mn—Zn based ferrite to which the present invention is applied will be described.

A Mn—Zn based ferrite to which the present invention is applied, comprises as main constituents $Fe_2O_3$: 62 to 68 mol %, ZnO: 12 to 20 mol %, and MnO substantially constituting the balance.

Increase of the content of $Fe_2O_3$ improves the saturation magnetic flux density in the high temperature region, but on the other hand, makes the core loss tend to be degraded. If the content of $Fe_2O_3$ is less than 62 mol %, the saturation magnetic flux density in the high temperature region decreases, while if the content of $Fe_2O_3$ exceeds 68 mol %, the increase of the core loss becomes remarkable. Accordingly, in the present invention, the content of $Fe_2O_3$ is set between 62 and 68 mol %. As the content of $Fe_2O_3$ is increased, the bottom temperature (the temperature at which the loss exhibits the minimum value) shifts to the higher temperature side. However, if the content of $Fe_2O_3$ is set between 62 and 68 mol %, the bottom temperature can be set within the range between 60 and 130° C. The content of $Fe_2O_3$ is preferably between 63 to 67 mol %, and more preferably 63 to 66 mol %.

The content of ZnO also affects the saturation magnetic flux density and the core loss. If the content of ZnO is less than 12 mol %, the saturation magnetic flux density decreases and the loss increases. Also, if the content of ZnO is more than 20 mol %, the saturation magnetic flux density decreases and the loss increases. Accordingly, in the present invention, the content of ZnO is set between 12 and 20 mol %. As the content of ZnO is increased, the bottom temperature shifts to the higher temperature side. However, if the content of ZnO is set between 12 and 20 mol %, the bottom temperature can be set within the range between 60 and 130° C. The content of ZnO is preferably 13 to 19 mol %, and more preferably 14 to 18 mol %.

The ferrite material of the present invention contains, as a main constituent, MnO as the substantial balance in addition to the above described constituents. It is preferable to further contain NiO and/or $LiO_{0.5}$.

NiO is effective for improving the saturation magnetic flux density with increase of the Curie temperature. In order to enjoy this effect, the ferrite material of the present invention preferably contains 0.2 mol % or more of NiO. However, if the content of NiO exceeds 5 mol %, the loss becomes large. Accordingly, in the present invention, NiO is contained less than 5 mol % (not inclusive of 0) in order to enjoy the effects of improving the saturation magnetic and low loss. The content of NiO is preferably between 0.2 and 5 mol %, more preferably 0.5 to 4 mol %, and further more preferably 0.5 to 3 mol %.

$LiO_{0.5}$ is effective in improving the saturation magnetic flux density in the high temperature region. However, when the content of $LiO_{0.5}$ is 4 mol % or more, the loss is increased, and the saturation magnetic flux density at 100° C. is decreased to a level equal to or lower than that before addition of $LiO_{0.5}$. Accordingly, in the present invention, the content of $LiO_{0.5}$ is set at less than 4 mol %. The content of $LiO_{0.5}$ is preferably 0.2 to 3.5 mol %, and more preferably 0.5 to 3 mol %. The lithium oxide is represented as $Li_2O$, but in the present invention, it is represented as "$LiO_{0.5}$" for the purpose of calculating the composition in terms of Li.

The sum of the contents of NiO and $LiO_{0.5}$ is preferably 0.2 to 5 mol %, more preferably 0.5 to 4 mol %, and furthermore preferably 1 to 3 mol %.

Next, the reason for limiting the additives will be described.

The ferrite material of the present invention can contain as first additives, Si in terms of $SiO_2$ and Ca in terms of $CaCO_3$ (hereinafter, referred to $SiO_2$, $CaCO_3$ as the case may be). Si and Ca segregate in the grain boundaries to form high-resistance layers and thereby contribute to decreasing the loss. In addition, Si and Ca have as sintering aids an effect for improving the density of sintered body.

The ferrite material of the present invention includes both of a case in which a slow cooling range is set in the temperature decreasing process in sintering and a case in which such a cooling is not set. When no slow cooling range is set, it is preferable that the sum of the contents of $SiO_2$ and $CaCO_3$, as first additives, is 1700 to 3000 ppm; and $SiO_2/CaCO_3$ is set at 0.055 or more. When the slow cooling range is set, a smaller sum of the contents of $SiO_2$ and $CaCO_3$ is sufficient. Specifically, it is preferable that the sum of the contents of $SiO_2$ and $CaCO_3$ is 900 to 3000 ppm under the condition that $SiO_2/CaCO_3$=0.055 to 0.30.

As a prerequisite for the above described conditions, the contents of $SiO_2$ and $CaCO_3$ can be 300 ppm or less (not inclusive of 0) and 2700 ppm or less (not inclusive of 0), respectively. When the content of $SiO_2$ exceeds 300 ppm or the content of $CaCO_3$ exceeds 2700 ppm, the degradation of the loss caused by discontinuous abnormal grain growth is large. Accordingly, in the present invention, it is required that the contents of $SiO_2$ and $CaCO_3$ be 300 ppm or less and 2700 ppm or less, respectively. The contents of $SiO_2$ and $CaCO_3$ are preferably 100 to 250 ppm and 1300 to 2500 ppm, respectively, and more preferably 150 to 200 ppm and 1500 to 2500 ppm, respectively.

By setting "$SiO_2/CaCO_3$" at an appropriate value and/or by setting the slow cooling range in the temperature decreasing process in sintering, the saturation magnetic flux density at 100° C. can be made to be 470 mT or more (measurement magnetic field: 1194 A/m) and the volume resistivity at room temperature can be made to be 0.13 Ω·m or more.

Inclusion of predetermined contents of Si and Ca contributes to lowering of the loss, has an effect as sintering aids in improving the density of sintered body, and effectively contributes to improving of the saturation magnetic flux density in the high temperature region.

The present invention can contain, as second additives, at least one selected from $Nb_2O_5$: 400 ppm or less (not inclusive of 0), $ZrO_2$: 1000 ppm or less (not inclusive of 0), $Ta_2O_5$: 1000 ppm or less (not inclusive of 0), $In_2O_3$: 1000 ppm or less (not inclusive of 0), and $Ga_2O_3$: 1000 ppm or less (not inclusive of 0). Inclusion of these second additives can yield an effect such that the saturation magnetic flux density is improved and/or the loss is reduced.

The present invention can contain, as third additives, at least one selected from $SnO_2$: 10000 ppm or less (not inclusive of 0) and $TiO_2$: 10000 ppm or less (not inclusive of 0). $SnO_2$ and $TiO_2$ are present inside the grains and in the grain boundaries, and have an effect of reducing loss. However, if the contents of $SnO_2$ and $TiO_2$ each exceed 10000 ppm, $SnO_2$ and $TiO_2$ cause degradation of loss and decrease of the saturation magnetic flux density, ascribable to the discontinuous abnormal grain growth. Accordingly, in the present invention, the upper limit of the content of $SnO_2$ and the upper limit of the content of $TiO_2$ are respectively set at 10000 ppm. On the other hand, in order to fully enjoy the above described effect, it is preferable that the third additives each are contained in a content of 500 ppm or more. The further preferable contents of the third additives are as follows: $SnO_2$: 1000 to 8000 ppm; and $TiO_2$: 1000 to 8000 ppm. The more preferable contents of the third additives are as follows: $SnO_2$: 1000 to 7000 ppm; and $TiO_2$: 1000 to 7000 ppm. Additionally, when these third additives are added in combination, the sum of the addition contents is preferably set at 10000 ppm or less.

The present invention can contain, as fourth additives, at least one selected from a P compound: 35 ppm or less (not inclusive of 0) in terms of P, $MoO_3$: 1000 ppm or less (not inclusive of 0), $V_2O_5$: 1000 ppm or less (not inclusive of 0), $GeO_2$: 1000 ppm or less (not inclusive of 0), $Bi_2O_3$: 1000 ppm or less (not inclusive of 0), and $Sb_2O_3$: 3000 ppm or less (not inclusive of 0). The fourth additives have as sintering aids an effect of improving the density of sintered body and contribute to low temperature sintering. In order to fully enjoy theses effects, the preferable contents of $MoO_3$, $V_2O_5$, $GeO_2$, $Bi_2O_3$, and $Sb_2O_3$ each are 50 ppm or more, and the preferable content of a P compound in terms of P is 5 ppm or more. Additionally, when these fourth additives are added in combination, the sum of the additive contents is preferably set at 2500 ppm or less.

The ferrite material of the present invention can attain, through selecting as appropriate the above described composition, a saturation magnetic flux density at 100° C. of 470 mT or more (measurement magnetic field: 1194 A/m), and moreover, 480 mT or more (measurement magnetic field: 1194 A/m). In addition to this, the bottom temperature at which the core loss exhibits the minimum value can be made to fall within a range between 60 and 130° C., and at the same time the minimum core loss value can be made to be 1300 kW/m³ or less (measurement conditions: 100 kHz, 200 mT). Through selecting a particularly preferable composition, it is also possible to obtain hitherto unobtainable properties such that the saturation magnetic flux density at 100° C. is 500 mT or more (measurement magnetic field: 1194 A/m) while the minimum core loss value is made to be 1200 kW/m³ or less (measurement conditions: 100 kHz, 200 mT). The bottom temperature can be set in a range preferably between 70 and 120° C., and more preferably between 80 and 120° C. Accordingly, ferrite components using the ferrite material of the present invention can find the bottom temperatures thereof within the practical operation temperature ranges thereof. Moreover, according to the ferrite material of the present invention, the initial permeability at room temperature has such a high value as 600 or more, and furthermore, 700 or more.

Next, a preferred method of producing the ferrite material of the present invention will be described below.

As raw materials used as main constituents, there are used powders of oxides or powders of compounds to be converted into oxides by heating. More specifically, $Fe_2O_3$ powders, $Mn_3O_4$ powders and ZnO powders, in addition, NiO powders, $Li_2CO_3$ powders and the like can be used. The mean particle sizes of the respective powers may be selected as appropriate in a range between 0.1 and 3.0 µm.

After the raw material powders of the main constituents have been subject to wet mixing, the mixture thus obtained is calcined. The calcination temperature may be selected to fall within a range between 800 and 1000° C. The calcination atmosphere may be nitrogen or atmospheric air. The stable calcination time may be selected as appropriate in a range between 0.5 and 5.0 hours.

After calcination, the calcined powder is milled. The milling is carried out so that the specific surface area may be 2.5 to 5.0 m²/g, and the 90% particle size may be 10 µm or less.

The specific surface area is made to be 2.5 to 5.0 m²/g because when the specific surface area is less than 2.5 m²/g, no sufficient density of sintered body and no high saturation magnetic flux density can be obtained, and when the specific surface area exceeds 5.0 m²/g, a large number of abnormal grain growths are observed after sintering, and hence the core loss (Pcv) and the initial permeability (µi) are degraded. The preferable specific surface area is 2.7 to 5.0 m²/g.

The 90% particle size is made to be 10 µm or less because when the 90% particle size exceeds 10 µm, no sufficient sintering density can be obtained. The preferable 90% particle size is 5 µm or less. Moreover, in the present invention, for the purpose of improving the saturation magnetic flux density, it is preferable that the 50% particle size falls within a range between 0.8 and 1.8 µm, and the 10% particle size falls within a range between 0.73 and 0.55 µm, in addition to the specification of the 90% particle size. It is to be noted that the 90% particle size and the like in the present invention are derived on the basis of the number of particles; the 90% particle size means the particle size at which the cumulative number of particles reaches 90%, the 50% particle size means the particle size at which the cumulative number of particles reaches 50%, and the 10% particle size means the particle size at which the cumulative number of particles reaches 10%.

In the above description, the calcined powder is milled to yield a powder having a specific surface area of 2.5 to 5.0 m²/g and a 90% particle size of 10 µm or less, but the present invention is not limited to this case. By milling the calcined powder without conducting any particular control, and classifying the thus obtained milled powder by use of a sieve or the like, there can also be obtained a powder having a specific surface area of 2.5 to 5.0 $m^2/g$ and a 90% particle size of 10 μm or less.

In addition, in the present invention, raw materials used as main constituents are not limited to those described above, but complex oxide powders containing two or more types of metals may be used as raw materials for main constituents. For example, an aqueous solution containing ferric chloride and Mn chloride is subjected to oxidizing roasting, so as to obtain a complex oxide powder containing Fe and Mn. This complex oxide powder may be mixed with a ZnO powder to prepare a main constituent raw material.

In such a case, no calcination is necessary. The mixed powder composed of the complex oxide powder and ZnO powder has only to have a specific surface area of 2.5 to 5.0 $m^2/g$ and a 90% particle size of 10 μm or less.

Similarly, as raw materials used as additives, there can be used powders of oxides or compounds to be converted to oxides by heating. Specifically, there can be used $SiO_2$, $CaCO_3$, $Nb_2O_5$, $ZrO_2$, $Ta_2O_5$, $In_2O_5$, $Ga_2O_5$, $SnO_2$, $TiO_2$, $MoO_3$, $V_2O_5$, $GeO_2$, $Bi_2O_3$, $Sb_2O_3$ and the like. When a P compound is selected as a fourth additive, a powder yielding the P compound by heating, for example, $Ca_3(PO_4)_2$ or the like can be used. Raw material powders used as these additives are mixed with powders of main constituents milled after calcining. Alternatively, after raw material powders used as additives and raw material powders used as main constituents have been mixed together, the raw material powders used as these additives can also be calcined together with the main constituents.

A powder consisting of main constituents and additives to meet need is granulated to smoothly carry out the following compacting step. Granulation can be carried out by use of, for example, a spray dryer. A suitable binder such as polyvinyl alcohol (PVA) is added in a small amount to the mixed powder, and the mixture is then sprayed and dried with a spray dryer. The granules thus obtained are preferably approximately between 80 and 200 μm in particle size.

The obtained granules are compacted into a desired form, using a press equipped with a die with a predetermined shape. The obtained compacted body is then sintered in the sintering step.

In the sintering, the compacted body is retained in a temperature range between 1250 and 1450° C. for approximately 2 to 10 hours. However, in order to fully bring forth the effect of the ferrite material of the present invention, the compacted body is preferably sintered in a range between 1300 and 1400° C.

As described above in detail, by adopting the composition recommended by the present invention, and making the conditions in each step be as described above, there can be attained a saturation magnetic flux density at 100° C. of 470 mT or more (measurement magnetic field: 1194 A/m) and moreover 480 mT or more (measurement magnetic field: 1194 A/m), and a minimum core loss value of 1400 kW/$m^3$ or less (measurement conditions: 100 kHz, 200 mT) and moreover 1300 kW/$m^3$ or less (measurement conditions: 100 kHz, 200 mT). In particular, through selecting a preferable composition, it is also possible to obtain hitherto unobtainable properties such that the saturation magnetic flux density at 100° C. is 500 mT or more (measurement magnetic field: 1194 A/m) while the minimum core loss value is made to be 1200 kW/$m^3$ or less (measurement conditions: 100 kHz, 200 mT). Moreover, according to the present invention, the initial permeability at room temperature has such a high value as 600 or more, and furthermore, 700 or more.

In the above description, of the preferable modes of the present invention, an approach has been described in which mainly the conditions in the steps prior to the sintering step are controlled. In what follows, description will be made on an approach in which mainly the conditions in the sintering step is controlled.

The sintering step, as shown in FIG. 1A, comprises a temperature increasing process (I) in which the temperature is increased up to a predetermined temperature, a temperature retention process (II), successive to the temperature increasing process (I), for retention at a predetermined temperature for a predetermined period of time, and a temperature decreasing process (III) carried out subsequently to the temperature retention process (II). In particular, for the purpose of improving the saturation magnetic flux density, it is effective to make the conditions in the temperature increasing process (I) and/or the temperature decreasing process (III) constituting the sintering step be the conditions recommended by the present invention.

<Temperature Increasing Process (I)>

In the present invention, a range in which the partial pressure of oxygen is 4.0% or less is set in the temperature increasing process (I). This range may cover the whole of or a part of the temperature increasing process (I). When a part is covered, the range is recommended to be a temperature range of 500° C. or higher. This is because when the partial pressure of oxygen in the temperature increasing process (I) exceeds 4.0%, the density is not sufficiently improved after sintering, and no high saturation magnetic flux density can be obtained. The partial pressure of oxygen is preferably 3.0% or less, and more preferably 2.5% or less.

In the present invention, the mean temperature increasing rate in the temperature increasing process (I) is set at 200° C./hr or less. This is because when the mean temperature increasing rate exceeds 200° C./hr, no high saturation magnetic flux density can be obtained. The mean temperature increasing rate is preferably 150° C./hr or less and more preferably 100° C./hr or less. The mean temperature increasing rate can be set at 200° C./hr or less from the initial stage of the temperature increase, but the effect of obtaining a high saturation magnetic flux density is remarkably obtained by making the temperature increasing rate be 200° C./hr or less on mean in the temperature range of 900° C. or higher. Accordingly, for the purpose of avoiding making the sintering step long in time, the mean temperature increasing rate in the temperature range of 900° C. or higher is preferably set at 200° C./hr or less.

Figure 1B:
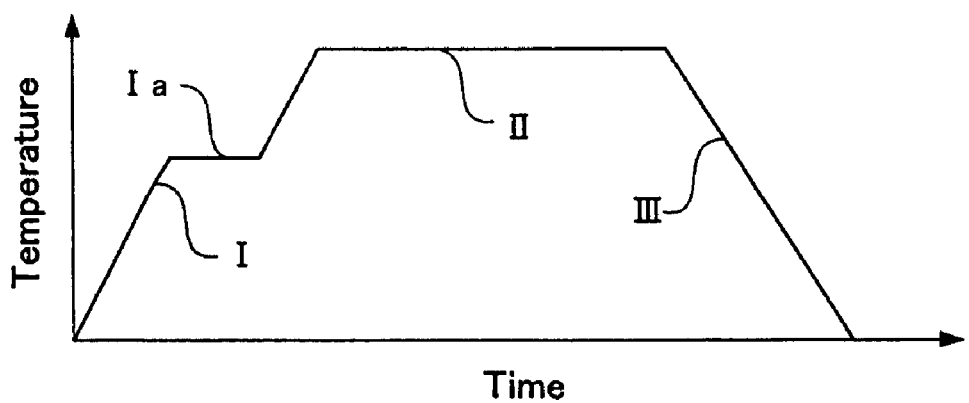
FIG. 1B is a graph showing a sintering pattern in which a constant temperature range (Ia) to maintain a predetermined temperature for a predetermined period of time is set.
Figure 1C:
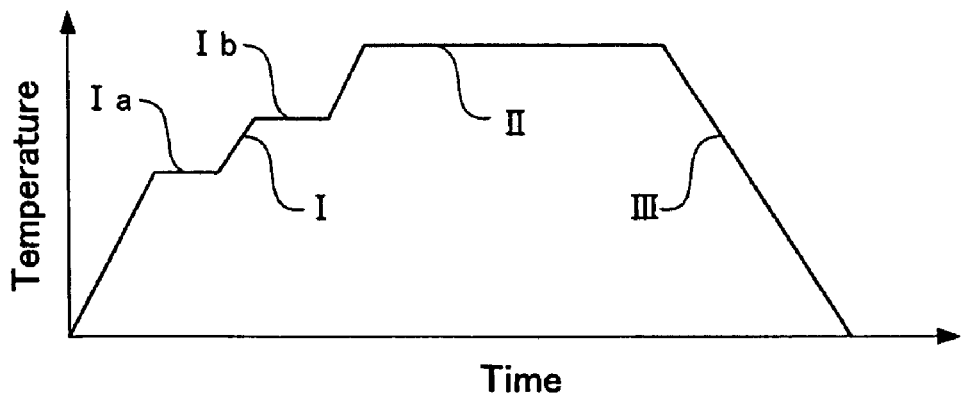
FIG. 1C is a graph showing a sintering pattern in which a plurality of constant temperature ranges (Ia, Ib) are set.

The temperature increasing process (I) is not limited to a case in which the temperature is continuously increased at a constant temperature increasing rate as shown in FIG. 1B, but a constant temperature range (Ia) can also be set where a predetermined temperature is maintained for a predetermined period of time as shown in FIG. 1B. As will be presented in the examples to be described later, it can be attempted to achieve a further improvement of the saturation magnetic flux density by setting the constant temperature range (Ia). It is also effective to set a plurality of constant temperature ranges (Ia, Ib) as shown in FIG. 1C.

<Temperature Retention Process (II)>

In succession to the temperature increasing process (I), the temperature retention process (II) is undertaken. The retention temperature in the temperature retention process (II) will be referred to as the sintering temperature in the present invention.

As described above, it is preferable that the sintering temperature can be selected as appropriate within the range between 1250 and 1450° C., and sintering is made in a temperature range between 1300 and 1400° C. in order to fully bring forth the effect of the ferrite material of the present invention. In the present invention, the partial pressure of oxygen in the atmosphere (sintering atmosphere) of this case is set at 2.0% or less, preferably 1.0% or less, and more preferably 0.5% or less. The retention time in the temperature retention process (II) may be selected as appropriate within a range between 2 and 10 hours.

<Temperature Decreasing Process (III)>

On completion of the temperature retention process (II), the temperature decreasing process (III) is undertaken. In the temperature decreasing process (III), the temperature can be continuously decreased at a constant temperature decreasing rate, or a constant temperature range can be set similarly to the temperature increasing process (I), as shown in FIGS. 1A to 1C.

Figure 2A:
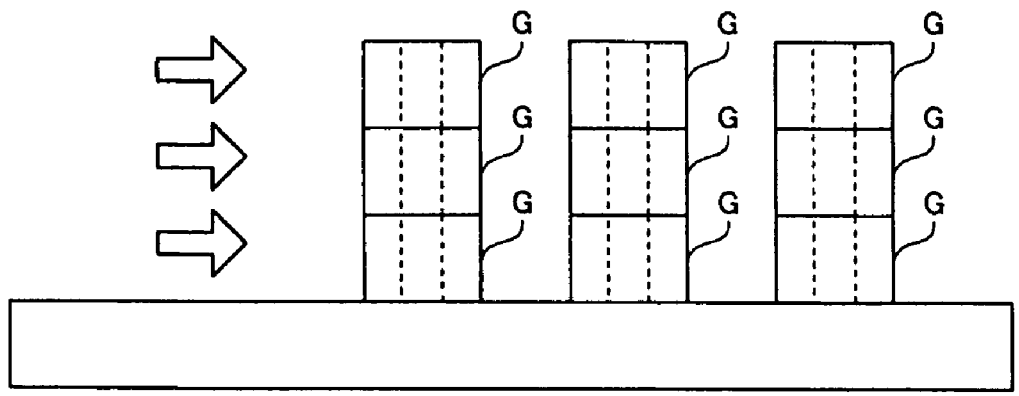
FIG. 2A is a diagram schematically showing the condition that a plurality of compacted bodies as sintering objects are laminated.

In the sintering furnace, compacted bodies to be sintered are arranged in a manner laminated in two or more layers. FIG. 2A is a diagram schematically showing this condition. According to the investigation of the present inventors, when the compacted bodies G are sintered in a laminated condition as shown in FIG. 2A, for example, the sintered bodies obtained from the compacted bodies G arranged in the upper layer and sintered bodies obtained from the compacted bodies G arranged in a middle layer are different in initial permeability and in core loss, causing dispersions of the properties.

The sintering is carried out by introducing a predetermined gas into the interior of the sintering furnace. For example, the sintering step is carried out while introducing, inside the sintering furnace, nitrogen gas controlled so as to give the above described partial pressure of oxygen. In this case, a gas flow (indicated by arrows in FIG. 2A) is generated inside the sintering furnace owing to the nitrogen gas to form the sintering atmosphere. The present inventors have inferred that the temperature dispersion in the sintering furnace due to the generation of the gas flow and the evaporation of Zn and the like due to the gas flow are the causes for the dispersions of the properties after sintering. Accordingly, for the purpose of preventing direct collision of the gas flow to the compacted bodies G, a screen substance P shown in FIG. 2B to be a barrier against the gas flow was arranged, and the dispersions of the properties were able to be reduced.

Figure 2B:
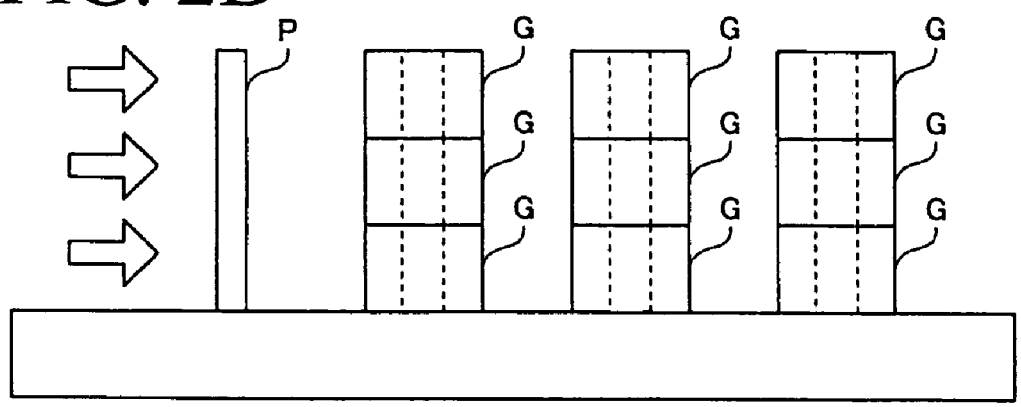
FIG. 2B is a diagram showing the condition that a screen substance to be a barrier against the gas flow is arranged.
Figure 2C:
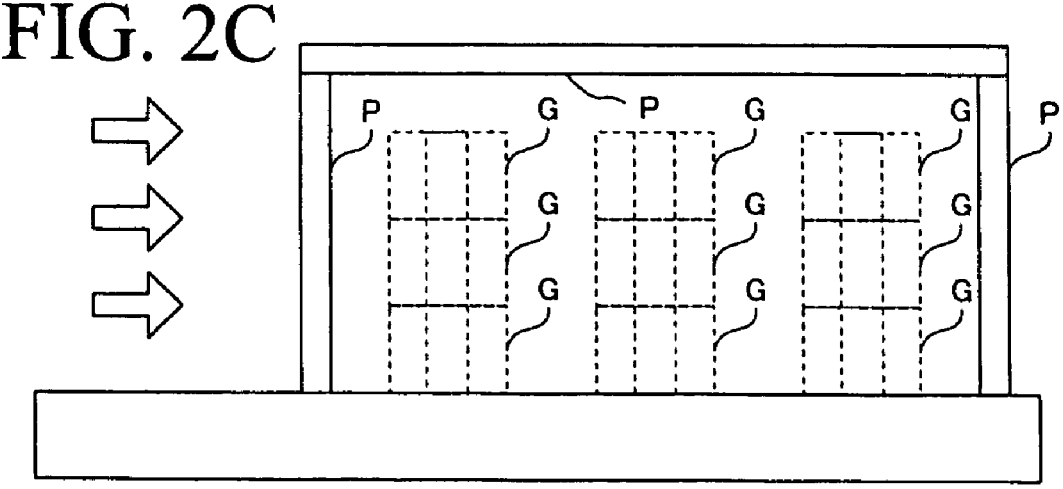
FIG. 2C is a diagram showing the condition that the screen substance is arranged so as to surround the compacted bodies.

The screen substance P, as shown in FIG. 2B, may be arranged at least at a position upstream of the gas flow in relation to the compacted bodies G; however, most preferably, the screen substance P is arranged so as to surround the compacted bodies G, as shown in FIG. 2C. It is to be avoided that the screen substance P surrounds the compacted bodies G in a gas-tight manner because the sintering can hardly proceed. It is preferable that, for the screen substance P, sintered bodies having the same composition as that of the ferrite material obtained by sintering of the compacted bodies G, because such a screen substance does not adversely affect the sintering atmosphere.

As described above, by controlling mainly the conditions of the temperature increasing process (I), there can be obtained a ferrite material which exhibits a relative density of 93% or more, and more preferably 95% or more.

It is preferable that the mean grain size of the ferrite sintered body is set in a range between 5 and 30 µm. This is because when the grain size is small, the hysteresis loss becomes large, while the grain size is large, the eddy current loss becomes large. The mean grain size is preferably 8 to 25 µm, and more preferably 10 to 20 µm.

The variations of the following quantities were measured when the partial pressure of oxygen ($PO_2$) in the sintering atmosphere was varied, and the obtained results are shown in FIG. 3: the volume resistivity at room temperature (hereinafter simply referred to as volume resistivity, and denoted by ρ as the case may be); the minimum core loss value at 100 kHz and 200 mT (hereinafter simply referred to as core loss, and denoted by Pcv as the case may be); the minimum eddy current loss value (hereinafter simply referred to as eddy current loss, and denoted by Pev as the case may be); the core loss change rate (hereinafter denoted by change rate of Pcv as the case may be); and the δ value (cation vacancy amount). The composition of the sample used for measurements was as shown below. The sintering temperature was set at 1350° C. The specific method for preparing the sample was in conformity with those in the examples to be described later.

Main constituents: $Fe_2O_3$; 64.0 mol %, MnO; 17.5 mol %, ZnO; 16.5 mol %, NiO; 2.0 mol %.

Additives: $SiO_2$; 100 ppm, $CaCO_3$; 1500 ppm, $Nb_2O_5$; 200 ppm.

As shown in FIG. 3, when the partial pressure of oxygen ($PO_2$) in the sintering atmosphere is low, the core loss change rate (change rate of Pcv) is small, but by contrast the core loss (Pcv) and the eddy current loss (Pev) are large, indicating that the core loss itself is degraded. The change rate of Pcv and the δ value are interrelated; for a δ value of 0.0034, the change rate of Pcv is of the order of 15%, and hence it can be found that the δ value is needed to be regulated to be 0.0033 or less for the purpose of making the change rate of Pcv be 10% or less.

The present invention proposes that the slow cooling range is set in the temperature decreasing process (III) for the purpose of suppressing the degradation of the core loss caused by the sintering under a low partial pressure of oxygen. Thus, the slow cooling range will be described with reference to FIGS. 4A to 4C.

Figure 4A:
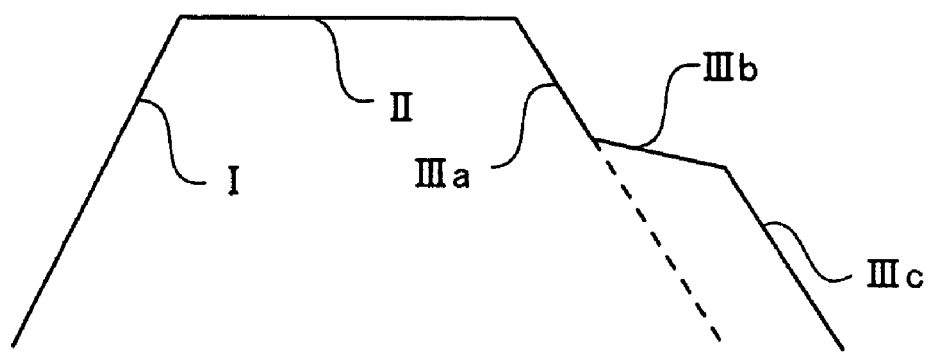
FIG. 4A is a graph showing an example in which a slow cooling range (IIIb) is set continuously.

In FIG. 4A, the temperature decreasing process (III) successive to the temperature retention process (II) is composed of IIIa, IIIb, and IIIc. The IIIb part is the slow cooling range. The slow cooling range IIIb is slower in cooling rate than the other ranges IIIa and IIIc. Specifically, in the slow cooling range IIIb, the cooling rate is set at 100° C./hr or less, preferably 50° C./hr or less, and more preferably 3° C./hr or less.

Figure 4B:
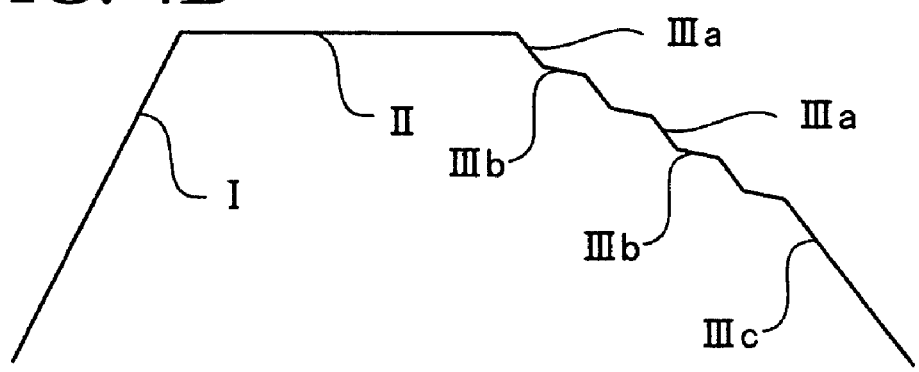
FIG. 4B is a graph showing an example in which slow cooling ranges (IIIb) are set intermittently.
Figure 4C:
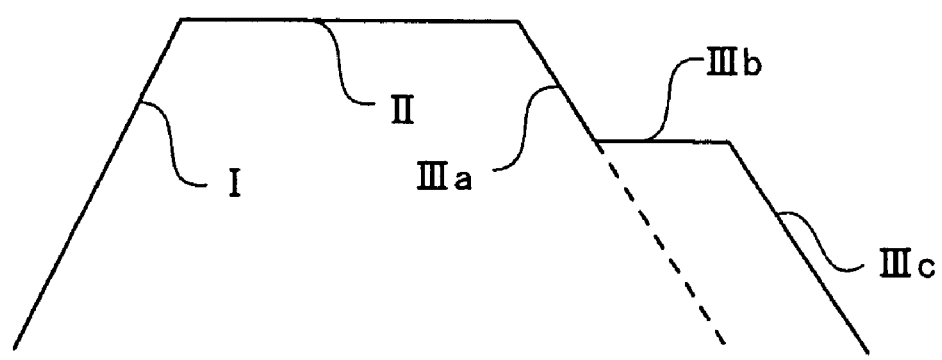
FIG. 4C is a graph showing a slow cooling range (IIIb) in a mode in which retention is made at a predetermined temperature for a predetermined period of time.

The setting of the slow cooling range IIIb is not limited to the case in which the slow cooling range IIIb is set continuously as shown in FIG. 4A, and the slow cooling ranges IIIb may be set intermittently as shown in FIG. 4B. Moreover, the slow cooling range IIIb of the present invention is not restricted to a temperature decreasing case, but is a concept including a mode in which the temperature is maintained at a predetermined temperature for a predetermined period of time as shown in FIG. 4C. This is based on the following understanding: as described above, the purpose of setting the slow cooling range IIIb is in that the additives such as CaO residing as solid solution inside the grains are made to segregate into the grain boundaries, and such a purpose is attainable even in a mode in which the temperature is maintained at a predetermined temperature for a predetermined period of time.

In the present invention, no constraint is imposed on the temperature range in which the slow cooling range IIIb is set; however, the effect of the slow cooling carried out in a temperature range between 1000 and 900° C. is large as will be described later. Accordingly, it is preferable that the slow cooling range IIIb is set in the temperature range between 1000 and 900° C. in the temperature decreasing process III. This is supported by the experimental results shown in FIG. 5.

The composition of the sample used for the measurements was the same as described above, and the sintering temperature was set at 1350° C. and the partial pressure of oxygen in sintering was set at 0.02%. As can be seen from FIG. 5, when the temperature of the slow cooling range IIIb was set between 1000 and 900° C., the volume resistivity (p) was highest, while the core loss (Pcv) and eddy current loss (Pev) were lowest. By slow cooling in the temperature range between 1000 and 900° C., the core loss can be reduced by a factor of ½ or less as compared to the case in which the slow cooling range IIIb is not set.

In the above description, an example has been shown in which the temperature decreasing process (III) is carried out immediately after the temperature retention process (II) carried out under a low partial pressure of oxygen; however, a process in which the temperature is decreased from the sintering temperature under a low partial pressure of oxygen can be set between the temperature retention process (II) and the temperature decreasing process (III).

In the above described temperature decreasing process (III), the partial pressure of oxygen in the sintering atmosphere is set at less than 1%, preferably at 0.2% or less, and more preferably at 0.05% or less. The sintering atmosphere is made to have such a low partial pressure of oxygen for the purpose of suppressing the cation vacancies tending to be generated for the Fe-rich ferrite composition as a target of the present invention.

EXAMPLES

Now, the present invention will be described below in detail with reference to specific examples.

Example 1

At the beginning, the reason for limiting the main constituents will be described by using Example 1.

As raw materials used as main constituents, a $Fe_2O_3$ powder, a MnO powder, a ZnO powder, a NiO powder and a $Li_2CO_3$ powder were prepared, and were weighed out so as to meet the compositions shown in FIG. 6. After weighing out, these powders were subjected to wet mixing, and the mixture thus obtained was calcined at 850° C. for 3 hours.

Then, the calcined substances of the raw materials used as main constituents and the raw materials used as additives were mixed together. For the raw materials used as additives, a $SiO_2$ powder: 200 ppm, a $CaCO_3$ powder: 1500 ppm and a $Nb_2O_5$ powder: 200 ppm were used. The raw materials used as additives were added to the calcined substances of the raw materials used as main constituents, and mixing was conducted while conducting milling.

The milling was carried out to a mean particle size of approximately 1.5 μm. A binder was added to each of the obtained mixtures, and the mixtures were subjected to granulation, and subjected to compacting so as to obtain toroidal compacted bodies.

The obtained compacted bodies were sintered, under a controlled partial pressure of oxygen, at 1350° C. (the temperature retention process: 5 hours, the partial pressure of oxygen ($PO_2$) in the temperature retention process: 0.02%, 1%), so as to obtain ferrite cores. In the temperature decreasing process of the sintering step (partial pressure of oxygen: 0.02%), a slow cooling range was set in which cooling was made at 30° C./hr in the temperature range between 1000 and 900° C. By use of these ferrite cores, measurements were made for the saturation magnetic flux density (hereinafter abbreviated as Bs, as the case may be) at 100° C. and at a measurement magnetic field of 1194 A/m, the core loss (measurement conditions: 100 kHz, 200 mT), the volume resistivity, and the core loss change rate. The results obtained are also shown in FIG. 6. The core loss change rates were derived on the basis of the following expression.

Core loss change rate=$(Pcv1-Pcv2)/Pcv1\times100$

Pcv1: Core loss before high temperature storage
Pcv2: Core loss after high temperature storage
High temperature storage: 150° C.×2000 hours For samples Nos. 1, 2, 3, 4 and 5, the content of $Fe_2O_3$ is increased in this order. It can be seen that, of these samples, the saturation magnetic flux density is low and the core loss is large in the case where the content of $Fe_2O_3$ is 60.0 mol % to be smaller than the content range of the present invention, and in the case where the content of $Fe_2O_3$ is 70.0 mol % to be larger than the content range of the present invention.

For samples Nos. 6, 7, 8 and 9, the content of ZnO is increased in this order. It can be seen that, of these samples, the saturation magnetic flux density is low and the core loss is large in the case where the content of ZnO is 10.0 mol % to be smaller than the content range of the present invention, and in the case where the content of ZnO is 21.0 mol % to be larger than the content range of the present invention.

From the above results, it can be found important that for the purpose of ensuring a high saturation magnetic flux density and a low core loss, the content of $Fe_2O_3$ is set in a range between 62 and 68 mol %, and the content of ZnO is set in a range between 12 and 20 mol %.

For samples Nos. 10, 11, 12 and 13, the content of NiO is increased in this order. As can be seen from FIG. 6, inclusion of NiO varies the core loss and the saturation magnetic flux density.

It is necessary to set the content of NiO in consideration of the facts that inclusion of NiO improves the saturation magnetic flux density and the core loss of a sample containing 6.0 mol % of NiO exceeds 1400 kW/m³. The content of NiO is preferably set in a range between 0.5 and 4.0 mol %.

For samples Nos. 14, 15, 16 and 17, the content of $LiO_{0.5}$ is increased in this order. As can be seen from FIG. 6, inclusion of $LiO_{0.5}$ varies the core loss and the saturation magnetic flux density.

It is necessary to set the content of $LiO_{0.5}$ in consideration of the facts that inclusion of $LiO_{0.5}$ improves the saturation magnetic flux density and the core loss of a sample containing 4.0 mol % of $LiO_{0.5}$ exceeds 1400 kW/m³. The content of $LiO_{0.5}$ is preferably set in a range equal to 0.2 mol % or more and less than 4.0 mol %.

Example 2

An experiment carried out for checking the relation between the specific surface area and the saturation magnetic flux density is described as Example 2.

As raw materials used as main constituents, a $Fe_2O_3$ powder: 65.6 mol %, a MnO powder: 18.9 mol %, a ZnO powder: 14.0 mol % and a NiO powder: 1.5 mol % were prepared, and were subjected to wet mixing, and the mixture thus obtained was calcined at 850° C. for 3 hours.

Then, the calcined powder was milled to obtain the milled powders, shown in FIG. 7, having various specific surface areas (SSA) and 90% particle sizes (90% Ps). A binder was added to each of the milled powders, and the mixtures were subjected to granulation, and subjected to compacting so as to obtain toroidal compacted bodies.

Ferrite cores were prepared from the obtained compacted bodies by a sintering in which the temperature was increased up to 1350° C., and thereafter the partial pressure of oxygen was controlled at 0.8% for a retention time of 5 hours. The obtained ferrite cores were subjected to the measurements of the saturation magnetic flux density (Bs) at 100° C. and at a measurement magnetic field of 1194 A/m, the density after sintering, the core loss (Pcv) at 80° C. (the bottom temperature) and the initial permeability (μi). The obtained results are shown in FIG. 7.

As shown in FIG. 7, in the case (sample No. 18) where the specific surface area (SSA) of the milled powder is less than 2.5 m$^2$/g, the density after sintering is small and hence the saturation magnetic flux density (Bs) is limited to a value of 500 mT or less. However, in the case (sample No. 25) where the specific surface area (SSA) of the milled powder exceeds 5.0 m$^2$/g, the core loss (Pcv) exceeds 1400 kW/m$^3$. Accordingly, in the present invention, the specific surface area (SSA) of a powder at the stage of obtaining a compacted body is set in a range between 2.5 and 5.0 m$^2$/g. As can be seen from FIG. 7, it is preferable to set the specific surface area (SSA) of a powder at the stage of obtaining a compacted body, in a range between 2.7 and 5.0 m$^2$/g for the purpose of obtaining a high saturation magnetic flux density (Bs).

From a comparison of the case (sample No. 19) where the specific surface area (SSA) of the milled powder is 2.5 m$^2$/g or more and the 90% particle size (90% Ps) exceeds 10 μm with the cases (samples Nos. 20 to 24) where the specific surface area (SSA) is 2.5 m$^2$/g or more and the 90% particle size (90% Ps) is less than 10 μm, it can be found that the saturation magnetic flux density (Bs) is higher in the latter cases. Accordingly, in the present invention, the 90% particle size is set at 10 μm or less, and preferably 5 μm or less. It can also be found that the 10% particle size (10% Ps) values of the powders fall within a range between 0.55 and 0.73 and the 50% particle size (50% Ps) values of the powders fall within a range between 0.8 and 1.8 μm, in the ferrite materials for which a high saturation magnetic flux density (Bs) and a low core loss (Pcv) were obtained.

Example 3

Ferrite cores shown in FIG. 8 according to the present invention were prepared in the same manner as in Example 2 except that the partial pressure of oxygen was set at 1.0% in retention at 1350° C. in sintering. These ferrite cores were subjected to the measurements of the saturation magnetic flux density (Bs) at 100° C. and at a measurement magnetic field of 1194 A/m, the density after sintering, the core loss (Pcv) at 100° C. (the bottom temperature) and the initial permeability (μi). The obtained results are shown in FIG. 8. By adopting the composition range specified in the present invention, and by using the powder having the specific surface area (SSA) and 90% particle size (90% Ps) set within the ranges of the present invention, there can be attained a saturation magnetic flux density (Bs) of 480 mT or more, furthermore 500 mT or more, and a core loss (Pcv) of 1200 kW/m$^3$ or less, furthermore 1000 kW/m$^3$ or less.

Example 4

An experiment carried out for checking the relation between the partial pressure of oxygen in the temperature increasing process in sintering and the saturation magnetic flux density is described as Example 4.

As raw materials used as main constituents, a Fe$_2$O$_3$ powder: 65.6 mol %, a MnO powder: 18.9 mol %, a ZnO powder: 14.0 mol % and a NiO powder: 1.5 mol % were prepared, and were subjected to wet mixing, and the mixture thus obtained was calcined at 850° C. for 3 hours.

Then, the calcined substance was milled to obtain a milled powder having a specific surface area (SSA) of 3.1 m$^2$/g and a 90% particle size (90% Ps) of 3.2 μm. A binder was added to the milled powder, and the mixture was subjected to granulation, and subjected to compacting so as to obtain a toroidal compacted bodies.

Ferrite cores were prepared from the obtained compacted bodies by a sintering in which the temperature was increased up to 900° C. at a rate of 300° C./hr, and further increased up to 1350° C. at a rate of 150° C./hr, thereafter retention was made for 5 hours. Specifically, four types of ferrite cores were prepared, by setting the partial pressure of oxygen at 0%, 1.0%, 3.0% and 5.0% in the temperature range between 900 and 1350° C., and at 1.0% in the retention at 1350° C. The partial pressure of oxygen in the temperature increasing process and that in the temperature retention process were set by introducing, inside the sintering furnace, a flow of nitrogen gas controlled to the above described partial pressures of oxygen. The ferrite cores were subjected to the measurement of the saturation magnetic flux density (Bs) at 100° C. and at a measurement magnetic field of 1194 A/m. The densities of the ferrite cores were also measured. The obtained results are shown in FIG. 9. FIG. 9 also shows the measurement results on the core loss (Pcv) at the bottom temperature, the bottom temperature (B. Temp.) and the initial permeability (μi) at 25° C.

As can be seen from FIG. 9, the saturation magnetic flux density (Bs) is improved with decreasing partial pressure of oxygen. With decreasing partial pressure of oxygen, the density is also improved, and this is understood as a factor improving the saturation magnetic flux density (Bs).

From the above described results, in the present invention, it is recommended to set the partial pressure of oxygen at 4.0% or less in the temperature increasing process at 900° C. or higher in the sintering step. The partial pressure of oxygen is preferably 2.5% or less, and more preferably 1.0% or less.

Example 5

An experiment carried out for checking the relations between the sintering conditions and the saturation magnetic flux density and the like is described as Example 5.

Toroidal compacted bodies were obtained in the same manner as in Example 4.

Seven types of ferrite cores were prepared by sintering the obtained compacted bodies by applying the temperature increasing conditions shown in FIG. 10. It is to be noted that the sintering was carried out with a larger sintering treatment quantity (the number of the compacted bodies) per a unit volume inside the furnace than in Example 4, and under the condition that the compacted bodies were laminated in three layers. The Mn—Zn based ferrite emits oxygen in the temperature increasing process in sintering, so that the magnetic properties thereof tend to be degraded with increasing sintering treatment quantity per a unit volume. The ferrite cores were subjected to the measurement of the saturation magnetic flux density (Bs) at 100° C. and at a measurement magnetic field of 1194 A/m. The densities of the ferrite cores were also measured. The obtained results are shown in FIG. 10. These measurement results are associated with the condition that no surround formed of the sintered body blocks to be described later was made.

The temperature increasing rate in FIG. 10 means a temperature increasing rate between 900 and 1350° C. Except for sample No. 41 for which the temperature increasing rate up to 900° C. was 300° C./hr and sample No. 42 for which the temperature increasing rate up to 900° C. was 100° C./hr, the temperature increasing rates up to 900° C. adopted for the other samples were the same as those described in FIG. 10. The constant temperature range in FIG. 10 means a range in which retention at a predetermined temperature is carried out for a predetermined period of time in the temperature increasing process between 900 and 1350° C. For example, in the case of sample No. 41, sintering was carried out in the following pattern in which the temperature was increased at a rate of 300° C./hr up to 900° C., increased at a rate of 75° C./hr from 900° C. to 1200° C., successively maintained at 1200° C. for 0.5 hours, increased after the elapsed time of 0.5 hours at a rate of 75° C./hr up to 1350° C., and then maintained at 1350° C. for 5 hours.

Figure 11:
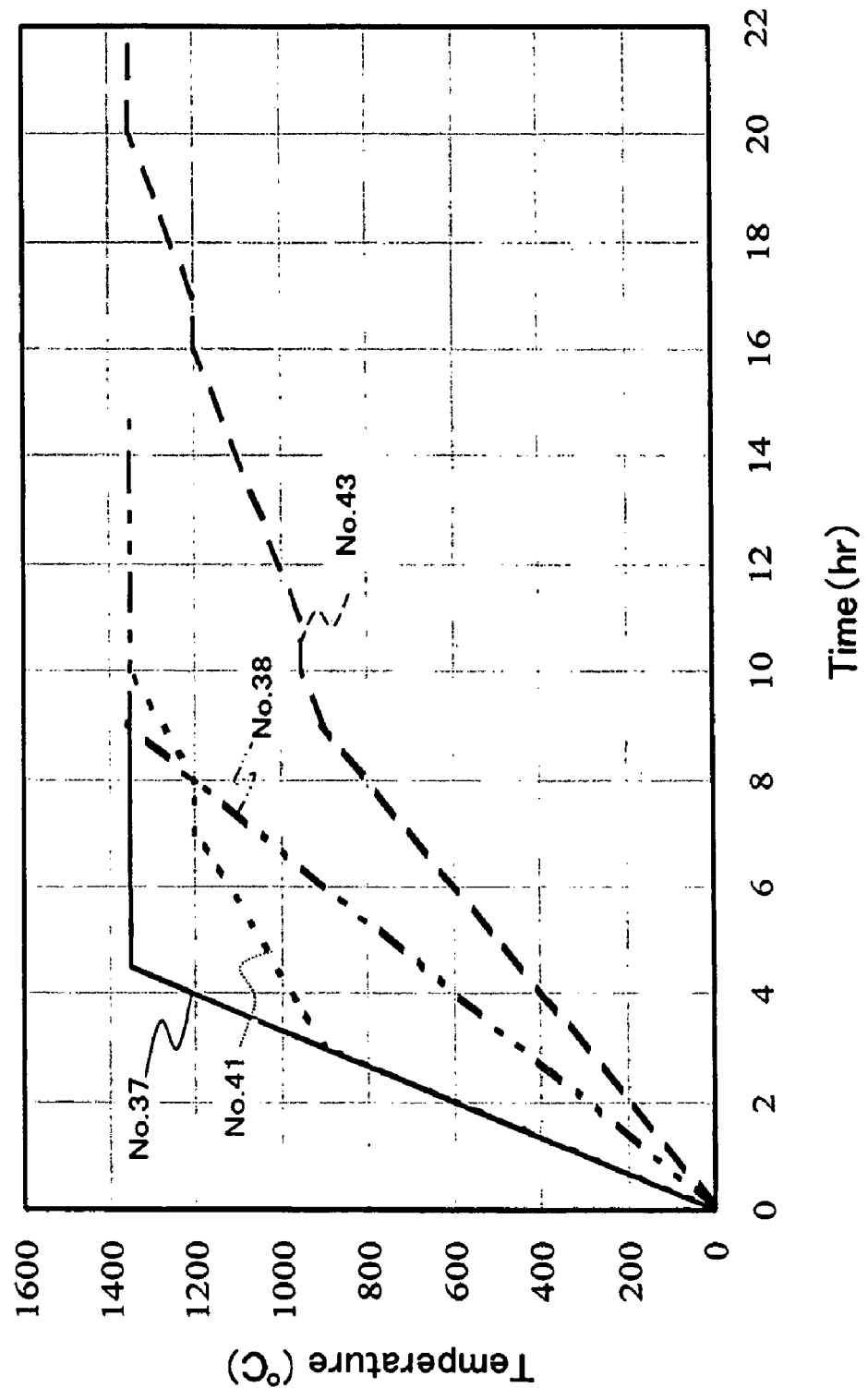
FIG. 11 is a graph showing as an example the sintering patterns of the samples shown in FIG. 10.

The sintering patterns of the samples shown in FIG. 10 are shown in FIG. 11 as an example. The partial pressure of oxygen in sintering was 0% in the temperature increasing process and 1.0% in the temperature retention process; these partial pressures were set by introducing, inside the sintering furnace, a flow of nitrogen gas controlled to the above described partial pressures of oxygen.

As shown in FIG. 10, sample No. 38 is higher and sample No. 39 is further higher in saturation magnetic flux density (Bs) than sample No. 37, and hence it is found that the slower temperature increasing rate is favorable for obtaining a high saturation magnetic flux density (Bs). Also from samples Nos. 40 to 42, it is found that the setting of the constant temperature range in the temperature increasing process further provides an effect for improving the saturation magnetic flux density (Bs). As shown in FIG. 11, the temperature was increased up to 900° C. at a rate of 300° C./hr for sample No. 41 in the same manner as for sample No. 37, and hence it is found that a small temperature increasing rate, specifically, a temperature increasing rate of 200° C./hr or less may be adopted in the temperature range of 900° C. or higher. Moreover, it is found that, as for sample No. 43, setting of two steps of constant temperature ranges can further improve the saturation magnetic flux density (Bs).

For samples Nos. 37, 39, 41 and 43, two patterns of sintering were carried out. In a first pattern, sintering was carried out in the condition in which the circumferences of the compacted bodies G were surrounded by the sintered body blocks having the same composition as that of the present example as shown in FIG. 2C. In a second pattern, sintering was carried out without surrounding the circumferences of the compacted bodies G by the sintered body blocks. The ferrite cores obtained by applying the first and second patterns were subjected to the measurements of the initial permeability (μi) and the core loss (Pcv). Of the ferrite cores laminated in three layers, the dispersions (change rates) of the initial permeability (μi) and the core loss (Pcv) were derived for the ferrite cores laminated in the upper and middle layers. The results obtained are shown in FIG. 10.

As can be seen from FIG. 10, the dispersions of the initial permeability (μi) and the core loss (Pcv) at the bottom temperature are smaller when sintered by arranging the surround than when sintered without arranging the surround.

Example 6

Ferrite cores shown in FIG. 12 were prepared in the same manner as in Example 4, and subjected to the measurements of the saturation magnetic flux density (Bs) at 100° C., the core loss (Pcv) at the bottom temperature, the bottom temperature (B. Temp.) and the initial permeability (μi). The results obtained are shown in FIG. 12, from which it can be seen that the present invention can be applied to various compositions. The partial pressure of oxygen was set at 0% in the temperature range between 900 and 1350° C. in the temperature increasing process.

Example 7

An experiment carried out for checking the relations between the atmosphere in the temperature increasing process and the saturation magnetic flux density and the like is described as Example 7.

Ferrite cores were prepared in the same manner as in Example 4 except that the atmosphere in the temperature increasing process was set as shown in FIG. 13, and subjected to the measurements of the saturation magnetic flux density (Bs) at 100° C., the core loss (Pcv) at the bottom temperature, the bottom temperature (B. Temp.) and the initial permeability (μi). The results obtained are shown in FIG. 13. As can be seen from FIG. 13, although it is effective that the partial pressure of oxygen is set at 0% starting from a lower temperature range, the effect of the present invention is obtained by setting a low partial pressure of oxygen starting from a temperature of 500° C. or higher.

Example 8

An experiment carried out for checking the variation of the properties of the ferrite material generated by controlling the total amount of $SiO_2$ and $CaCO_3$ as additives and the ratio between $SiO_2$ and $CaCO_3$ is described as Example 8.

As raw materials used as main constituents, a $Fe_2O_3$ powder: 64.0 mol %, a MnO powder: 17.5 mol %, a ZnO powder: 16.5 mol % and a NiO powder: 2.0 mol % were prepared, and were subjected to wet mixing, and the mixture thus obtained was calcined at 850° C. for 3 hours.

Then, the calcined substances of the raw materials used as main constituents and the raw materials used as additives were mixed together. For the raw materials used as additives, a $SiO_2$ powder, a $CaCO_3$ powder and a $Nb_2O_5$ powder were used. The raw materials used as additives were added to the calcined substances of the raw materials used as main constituents, and mixing was conducted while conducting milling. The milling was carried out to a mean particle size of approximately 1.5 μm. A binder was added to each of the obtained mixtures, and the mixtures were subjected to granulation, and subjected to compacting so as to obtain toroidal compacted bodies.

The blending ratios of the main constituents and the $Nb_2O_5$ powder were as follows:

$Fe_2O_3$: 64.0 mol %, MnO: 17.5 mol %, ZnO: 16.5 mol %, NiO: 2.0 mol %, $Nb_2O_5$: 200 ppm.

As for $SiO_2$ and $CaCO_3$ of the additives, the blending ratios of the $SiO_2$ powder and the $CaCO_3$ powder were varied as shown in FIG. 14.

The obtained compacted bodies were sintered, under a controlled partial pressure of oxygen, at 1350° C. (the temperature retention process: 5 hours, the partial pressure of oxygen ($PO_2$) in the temperature retention process: 0.02%, 1%), so as to obtain ferrite cores.

By use of these ferrite cores, measurements were made, in the same way as in Example 1, for the saturation magnetic flux density (hereinafter referred as Bs as the case may be) at 100° C. and at a measurement magnetic field of 1194 A/m, the core loss (measurement conditions: 100 kHz, 200 mT), the volume resistivity, and the core loss change rate. The results obtained are also shown in FIG. 14.

The present invention takes as its premise a high saturation magnetic flux density and takes as its object the provision of a ferrite material low in core loss and high in reliability for core loss. In FIG. 14, any material of samples Nos. 55-1 to 65 has such a high saturation magnetic flux density as 450 mT or more or 470 mT or more, or furthermore, 500 mT or more. However, as for the core loss and the core loss change rate, limited examples are excellent in both of these properties. For example, a comparison of No. 55-1 (the partial pressure of oxygen in the temperature retention process is 0.02%) with sample No. 55-2 (the partial pressure of oxygen in the temperature retention process is 1.0%) shows that the former exhibits such a low core loss change rate as 2.7% and has a core loss exceeding 3500 kW/m$^3$, while the latter exhibits a core loss of 1500 kW/m$^3$ or less and has such a poor core loss change rate as 15.4%. Such a tendency is similarly found between samples Nos. 56-1 and 56-2, and the like. As described above, the differences just mentioned above are ascribable to the partial pressure of oxygen in the temperature retention process in sintering.

On the other hand, sample No. 58-1 or Samples Nos. 61 to 63 and 65 are low both in core loss and in core loss change rate. A comparison of these materials with the other materials shows that the former and the latter are different in the total amount of SiO$_2$ and CaCO$_3$ as additives and the ratio of SiO$_2$ to CaCO$_3$ (SiO$_2$/CaCO$_3$, denoted by Si/Ca in the figure). In other words, the materials low both in core loss and in core loss change rate have a high total amount of SiO$_2$ and CaCO$_3$ or a high ratio of SiO$_2$ to CaCO$_3$. For example, a comparison of sample No. 55-1 with sample No. 62 shows that there is such a small difference as 100 ppm between the total amounts of SiO$_2$ and CaCO$_3$ in these samples, but as for the ratio of SiO$_2$ to CaCO$_3$, sample No. 55-1 has a value of 0.050, while sample No. 62 has such a high value as 0.100. A comparison of sample No. 57-1 with sample No. 58-1 shows that sample No. 57-1 has a higher ratio of SiO$_2$ to CaCO$_3$, but sample No. 58-1 has such a higher total amount of SiO$_2$ and CaCO$_3$ as 2650 ppm.

On the basis of the above description, there can be cited the controlling of the total amount of the additives, SiO$_2$ and CaCO$_3$ and/or the ratio of SiO$_2$ to CaCO$_3$, as a factor for ensuring the low core loss and the core loss stability in a Fe-rich ferrite material which takes as its premise a high saturation magnetic flux density and is sintered in a low partial pressure of oxygen. Specifically, the ratio of SiO$_2$ to CaCO$_3$ preferably exceeds 0.055. The total amount of SiO$_2$ and CaCO$_3$ is preferably set at 1700 ppm or more. Within the above described ranges, the total amount of SiO$_2$ and CaCO$_3$ is preferably increased when the ratio of SiO$_2$ to CaCO$_3$ is small, while the total amount of SiO$_2$ and CaCO$_3$ can be decreased when the ratio of SiO$_2$ to CaCO$_3$ is large.

As described above, a low core loss and a core loss stability can be ensured by controlling the total amount of SiO$_2$ and CaCO$_3$ as additives and the ratio of SiO$_2$ to CaCO$_3$. As will be shown in Example 9, this effect becomes remarkable by setting a slow cooling range in the temperature decreasing process in the sintering step.

Example 9

An experiment carried out for checking the effects in the cases where a slow cooling range was set in the temperature decreasing process in the sintering step is described as Example 9.

FIG. 15 shows the properties such as the saturation magnetic flux density of the materials obtained on the basis of the compositions and the preparing method similar to those for the materials shown in FIG. 14. However, the materials shown in FIG. 15 are different, from the materials shown in FIG. 14, in that the materials in FIG. 15 are prepared by setting a slow cooling range in which cooling was carried out at 30° C./hr in the temperature range between 1000 and 900° C. in the temperature decreasing process. The cooling rates in the ranges other than the slow cooling range were 300° C./hr. For reference, the "correspondence" column of FIG. 15 shows the numbers of the samples in FIG. 14 having the same compositions as the samples in FIG. 15.

Samples Nos. 57-1 and 60 in FIG. 14 exhibited core loss values exceeding 1500 kW/m$^3$ or 2000 kW/m$^3$, but the core loss values of these samples were made to be 1500 kW/m$^3$ or less by setting the slow cooling range. The volume resistivities were also varied from 0.1 Ω·m or less to the values exceeding 0.2 Ω·m or 0.4 Ω·m.

As described above, controlling the total amount of SiO$_2$ and CaCO$_3$ as additives and the ratio of SiO$_2$ to CaCO$_3$ is effective for low core loss and core loss stability, and this effect becomes remarkable by setting a slow cooling range in the temperature decreasing process in the sintering step. By setting a slow cooling range in the temperature decreasing process, a low core loss and a core loss stability can be ensured even when the total amount of SiO$_2$ and CaCO$_3$ is of the order of 900 ppm.

The reason for attaining such an effect was investigated. Consequently, segregation of SiO$_2$ and CaCO$_3$ into the grain boundaries was verified, and the degree of segregation was verified to become remarkable by setting a slow cooling range, in the materials in which the total amount of SiO$_2$ and CaCO$_3$ as additives and the ratio of SiO$_2$ to CaCO$_3$ are large. On the contrary, in the materials in which the total amount of SiO$_2$ and CaCO$_3$ as additives or the ratio of SiO$_2$ to CaCO$_3$ is small, no segregation of SiO$_2$ and CaCO$_3$ into the grain boundaries was verified.

Example 10

An experiment carried out for checking the effects in the cases where second additives and fourth additives were contained is described as Example 10.

Ferrite cores having the compositions shown in FIG. 16 were prepared in the same manner as in Example 1. As the additive, the additives shown in FIG. 16 were added each alone in addition to SiO$_2$, CaCO$_3$ and Nb$_2$O$_5$. It may be noted that P is added as calcium phosphate. In FIG. 16, the additive amount of P is given in terms of P. In the temperature decreasing process in the sintering step (partial pressure of oxygen: 0.02%), as low cooling range was set in which cooling was carried out at 30° C./hr in a temperature range between 1000 and 900° C. By use of these ferrite cores, the measurements of the saturation magnetic flux density and the like were carried out in the same way as in Example 1. The results obtained are also shown in FIG. 16.

As can be seen from FIG. 16, by containing a second additive or a fourth additive, the saturation magnetic flux density (Bs) was made to exceed 500 mT, and it is found that these additives are effective in improving the saturation magnetic flux density. This effect is found effective even in the case where a slow cooling range was set in the temperature decreasing process in the sintering step.

INDUSTRIAL APPLICABILITY

According to the present invention, the saturation magnetic flux density of Mn—Zn based ferrite in the high temperature region can be improved, and accordingly the present invention can meet the large current supply demanded for power supply lines as a result of high density integration and high speed processing of various components.

Additionally, according to the present invention, there is provided a ferrite material having a high saturation magnetic flux density in the high temperature region, a low core loss and a high reliability for the core loss.

The invention claimed is:

1. A production method of a ferrite material comprising as main constituents $Fe_2O_3$:62 to 68 mol %, ZnO:12 to 20 mol %, and MnO, characterized by comprising:
   a compacting step for obtaining a compacted body by using a powder comprising said main constituents, wherein said powder has a specific surface area falling within a range between 2.5 and 5.0 m²/g and a 90% particle size of 10 μm or less;
   a sintering step for sintering said compacted body obtained in said compacting step; wherein
   a 50% particle size of said powder falls within a range between 0.8 and 1.8 μm and a 10% particle size of said powder falls within a range between 0.55 and 0.73 μm.

2. The production method of a ferrite material according to claim 1, characterized in that the specific surface area of said powder falls within a range between 2.7 and 5.0 m²/g and the 90% particle size of said powder is 5 μm or less.

3. The production method of a ferrite material according to claim 1, characterized in that said sintering step comprises:
   a temperature increasing process for increasing the temperature up to a predetermined temperature, wherein a temperature range having a partial pressure range of oxygen of 4.0% or less is provided;
   a temperature retention process for retaining the sintering atmosphere at said predetermined temperature; and
   a temperature decreasing process subsequent to said temperature retention process.

4. The production method of a ferrite material according to claim 1 characterized in that said sintering step comprises:
   a temperature retention process for retaining the sintering atmosphere in a predetermined temperature range; and
   a temperature decreasing process to be carried out in a nitrogen atmosphere subsequent to said temperature retention process, wherein a slow cooling range having a cooling rate of 100° C./hr or less is set in said temperature decreasing process.

5. The production method of a ferrite material according to claim 1, characterized in that said ferrite material comprises NiO: 5 mol % or less (not inclusive of 0%) and/or $LiO_{0.5}$ less than 4 mol % (not inclusive of 0).

6. The production method of a ferrite material according to claim 1, characterized in that said ferrite material has a saturation magnetic flux density at 100° C. of 470 mT or more (measurement magnetic field: 1194 A/m), and a core loss of 1400 kW/m³ or less (measurement conditions: 100 kHz, 200 mT).

7. The production method of a ferrite material according to claim 1, characterized in that said ferrite material has a volume resistivity of 0.13 Ωm or more at room temperature.

8. A production method of a ferrite material comprising as main constituents $Fe_2 O_3$: 62 to 68 mol %, ZnO: 12 to 20 mol %, and MnO, characterized by comprising:
   a compacting step for obtaining a compacted body by using a powder comprising said main constituents, wherein said powder has a specific surface area falling within a range between 2.5 and 5.0 m²/g and a 90% particle size of 10 μm or less;
   a sintering step for sintering said compacted body obtained in said compacting step; wherein
   in said sintering step, a screen substance is arranged to block the direct collision of the gas flow generated in the sintering atmosphere against said compacted body.

9. The production method of a ferrite material according to claim 8, characterized in that said sintering is carried out while a plurality of said compacted bodies are laminated, and said screen substance is arranged so as to surround said compacted bodies.

10. The production method of a ferrite material according to claim 9, characterized in that said screen substance is constituted of a sintered body having substantially the same composition as that of the desired ferrite material.

11. A ferrite material characterized in that the core loss thereof is 1400 kW/m³ or less (measurement conditions: 100 kHz, 200 mT), and:
    the ferrite material is made of a sintered body comprising as main constituents $Fe_2O_3$: 62 to 68 mol %, ZnO: 12 to 20 mol %, and MnO;
    the saturation magnetic flux density thereof at 100° C. is 470 mT or more (measurement magnetic field: 1194 A/m); and
    the volume resistivity thereof at room temperature is 0.13 Ωm or more, wherein the ferrite material comprises Si and Ca as first additives in a combined content of 900 to 3000 ppm in terms of $SiO_2$ and $CaCO_3$, respectively, under the condition that $SiO_2/CaCO_3$=0.055 to 0.30.

12. The ferrite material according to claim 11, characterized in that the ferrite material comprises Si and Ca as first additives in a combined content of 1700 to 3000 ppm in terms of $SiO_2$ and $CaCO_3$, respectively, under the condition that $SiO_2/CaCO_3$=0.055 to 0.19.

13. The ferrite material according to claim 11, characterized in that said ferrite material comprises NiO: 5 mol % or less (not inclusive of 0%) and/or $LiO_{0.5}$ less than 4 mol % (not inclusive of 0).

14. The ferrite material according to claim 11, characterized in that the core loss change rate thereof is 10% or less (core loss change rate =(Pcv1−Pcv2)/Pcv1×100, Pcv1: core loss before high temperature storage, Pcv2: core loss after high temperature storage, high temperature storage: 150° C. ×2000 hours).

15. The ferrite material according to claim 11, characterized in that the δ value (the cation vacancy amount) in the following ferrite composition formula (1) is 0.0033 or less:

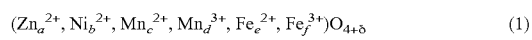  (1)

where a+b+C+d+e+f=3, and
δ=a+b+c+(3/2)d+e+(3/2)f−4.

16. The ferrite material according to claim 11, characterized in that:
    said ferrite material comprises $LiO_{0.5}$: less than 4 mol % (not inclusive of 0);
    the saturation magnetic flux density thereof at 100° C. is 490 mT or more (measurement magnetic field: 1194 A/m); and
    the core loss thereof is 1300 kW/m³ or less (measurement conditions: 100 kHz, 200 mT).

17. The ferrite material according to claim 11, characterized in that the ferrite material comprises as additives, at least one selected from $Nb_2O_5$: 400 ppm or less (not inclusive of 0), $ZrO_2$: 1000 ppm or less (not inclusive of 0), $Ta_2 O_5$: 1000 ppm or less (not inclusive of 0), $In_2O_3$: 1000 ppm or less (not inclusive of 0), and $Ga_2O_3$: 1000 ppm or less (not inclusive of 0).

18. The ferrite material according to claim 11, characterized in that the ferrite material comprises, as additives, at least one selected from $SnO_2$: 10000 ppm or less (not inclusive of 0) and $TiO_2$: 10000 ppm or less (not inclusive of 0).

19. The ferrite material according to claim 11, characterized in that the ferrite material comprises, as additives, at least one selected from a P compound: 35 ppm or less (not inclusive of 0) in terms of P, $MoO_3$: 1000 ppm or less (not inclusive of 0), $V_2O_5$: 1000 ppm or less (not inclusive of 0), $GeO_2$: 1000 ppm or less (not inclusive of 0), $Bi_2O_3$: 1000 ppm or less (not inclusive of 0), and $Sb_2O_3$: 3000 ppm or less (not inclusive of 0).

* * * * *